United States Patent
Singnurkar

(10) Patent No.: US 8,179,113 B2
(45) Date of Patent: May 15, 2012

(54) BUCK-BOOST SWITCHING REGULATOR AND METHOD THEREOF FOR DC/DC CONVERSION

(75) Inventor: Pramod Singnurkar, Graz (AT)

(73) Assignee: austriamicrosystems AG, Unterpremstätten (AT)

( * ) Notice: Subject to any disclaimer, the term of this patent is extended or adjusted under 35 U.S.C. 154(b) by 0 days.

(21) Appl. No.: 12/666,973

(22) PCT Filed: Jun. 26, 2008

(86) PCT No.: PCT/EP2008/058210
§ 371 (c)(1),
(2), (4) Date: Aug. 30, 2010

(87) PCT Pub. No.: WO2009/000901
PCT Pub. Date: Dec. 31, 2008

(65) Prior Publication Data
US 2010/0327833 A1 Dec. 30, 2010

(30) Foreign Application Priority Data
Jun. 26, 2007 (EP) .................... 07012511

(51) Int. Cl.
 *G05F 1/00* (2006.01)
(52) U.S. Cl. ........................ 323/283; 323/282
(58) Field of Classification Search .................. 323/222, 323/223, 225, 259, 268, 271, 282, 285, 311, 323/312
See application file for complete search history.

(56) References Cited

U.S. PATENT DOCUMENTS

| | | | |
|---|---|---|---|
| 4,837,495 A | 6/1989 | Zansky | |
| 4,975,820 A | 12/1990 | Szepesi | |
| 5,402,060 A | 3/1995 | Erisman et al. | |
| 6,037,755 A | 3/2000 | Mao et al. | |
| 6,069,807 A | 5/2000 | Boylan et al. | |
| 6,087,816 A | 7/2000 | Volk et al. | |
| 6,166,257 A * | 12/2000 | Mathey et al. | 564/305 |
| 6,166,527 A * | 12/2000 | Dwelley et al. | 323/222 |
| 6,246,222 B1 | 6/2001 | Nilles et al. | |
| 6,275,016 B1 * | 8/2001 | Ivanov | 323/224 |
| 6,717,388 B2 | 4/2004 | Smidt et al. | |

(Continued)

FOREIGN PATENT DOCUMENTS

| | | |
|---|---|---|
| EP | 1388927 A2 | 2/2004 |
| EP | 1804368 | 7/2007 |
| WO | WO 2007/021282 | 2/2007 |

OTHER PUBLICATIONS

Gaboriault et al.; A High Efficiency, Non-Inverting, Buck-Boost DC-DC Converter, Sep. 27, 2004, IEEE, APEC'04, 1411-1415.*

(Continued)

*Primary Examiner* — Matthew Nguyen
*Assistant Examiner* — Lakaisha Jackson
(74) *Attorney, Agent, or Firm* — Cozen O'Connor

(57) ABSTRACT

A method for DC/DC conversion comprises operating in a Boost mode of operation or in a Buck-Boost mode of operation. Furthermore, the method comprises switching from the Boost mode of operation to the Buck-Boost mode of operation, if a desired value (VOUTR) of an output voltage (VOUT) which is generated from a supply voltage (VIN) by the DC/DC conversion is smaller than a first reference voltage (VR1). The method also comprises switching from the Buck-Boost mode of operation to the Boost mode of operation, if the desired value (VOUTR) is larger than a second reference voltage (VR2).

21 Claims, 10 Drawing Sheets

U.S. PATENT DOCUMENTS

| | | | |
|---|---|---|---|
| 6,930,526 | B1 | 8/2005 | Silva |
| 7,116,085 | B2 * | 10/2006 | Ikezawa ........................ 323/225 |
| 7,466,112 | B2 * | 12/2008 | Zhou et al. .................... 323/259 |
| 2002/0190698 | A1 | 12/2002 | Smidt et al. |
| 2004/0046535 | A1 | 3/2004 | Duffy et al. |
| 2004/0090804 | A1 | 5/2004 | Lipcsei et al. |
| 2005/0093526 | A1 | 5/2005 | Notman |
| 2005/0110475 | A1 * | 5/2005 | Chapuis ........................ 323/282 |
| 2006/0284606 | A1 * | 12/2006 | Chen et al. .................... 323/259 |
| 2007/0085519 | A1 * | 4/2007 | Xu ................................. 323/282 |

OTHER PUBLICATIONS

Modelling, analysis and compensation of the current-mode converter: Unitrode Corp., Merrimack, NH, application note U-97, pp. 3-43 to 3-48, retrieved from internet on Jul. 11, 2007; according to the international Search Report Jan. 1, 1999, XP002466517.

Mammano, B., "Current Sensing Solutions for Power Supply Designers", Texas Instruments Inc., Dallas, Texas, USA, 2001, p. 1-1 to 1-34.

Mohan, N. et al., "Power Electronics: Converters, Applications and Design", ISBN 0-471-50537*4, John Wiley & Sons, p. 257, paragraph 8-8-6 and p. 651-652, 1989.

Tse, C.K. et al., "Control of Bifurcation in Current-Programmed DC/DC Converters: An Alternative Viewpoint of Ramp Compensation", Industrial Electronics Society, 26$^{th}$ Annual Conference of the IEEE, Oct. 22-28, 2000, Piscataway, NJ, USA, pp. 2413-2418.

B. Sahu et al., "A Low Voltage, Dynamic, Noninverting, Synchronous Buck-Boost Converter for Portable Applications", IEEE Transactions on Power Electronics, vol. 19, No. 2, Mar. 2004, pp. 443-452.

* cited by examiner

Buck-Boost mode

| SP1 | SP2 | Duration | Switching Phase | Switch |
|---|---|---|---|---|
| LOW | LOW | tp2 | A | 42,45 on 43,44 off |
| LOW | HIGH | td1 | B | 42,44 on 43,45 off |
| LOW | LOW | tp1 | C | 42,45 on 43,44 off |
| HIGH | LOW | td2 | D | 43,45 on 42,44 off |

FIG 2C
Boost mode
| SP1 | SP2 | Duration | Switching Phase | Switch |
|---|---|---|---|---|
| LOW | HIGH | tu | B | 42,44 on 43,45 off |
| LOW | LOW | T-tu | A | 42,45 on 43,44 off |
FIG 2D
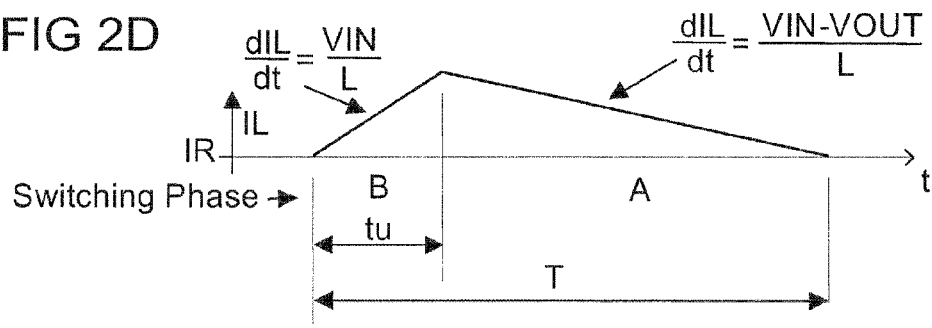
FIG 2E
Buck mode
| SP1 | SP2 | Duration | Switching Phase | Switch |
|---|---|---|---|---|
| LOW | LOW | td | A | 42,45 on 43,44 off |
| HIGH | LOW | T-td | D | 43,45 on 42,44 off |
FIG 2F
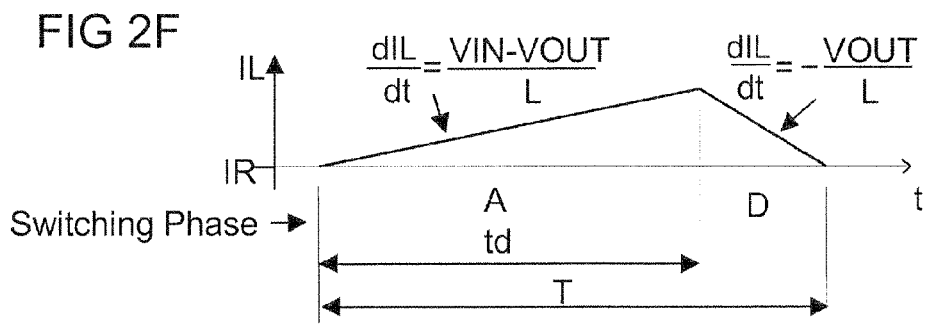

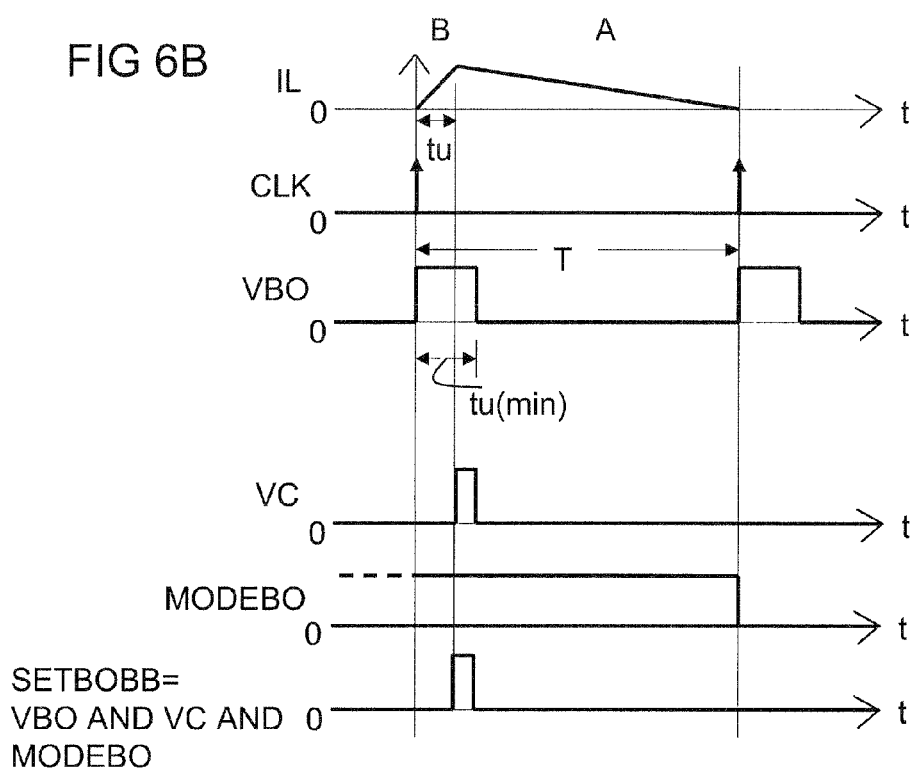
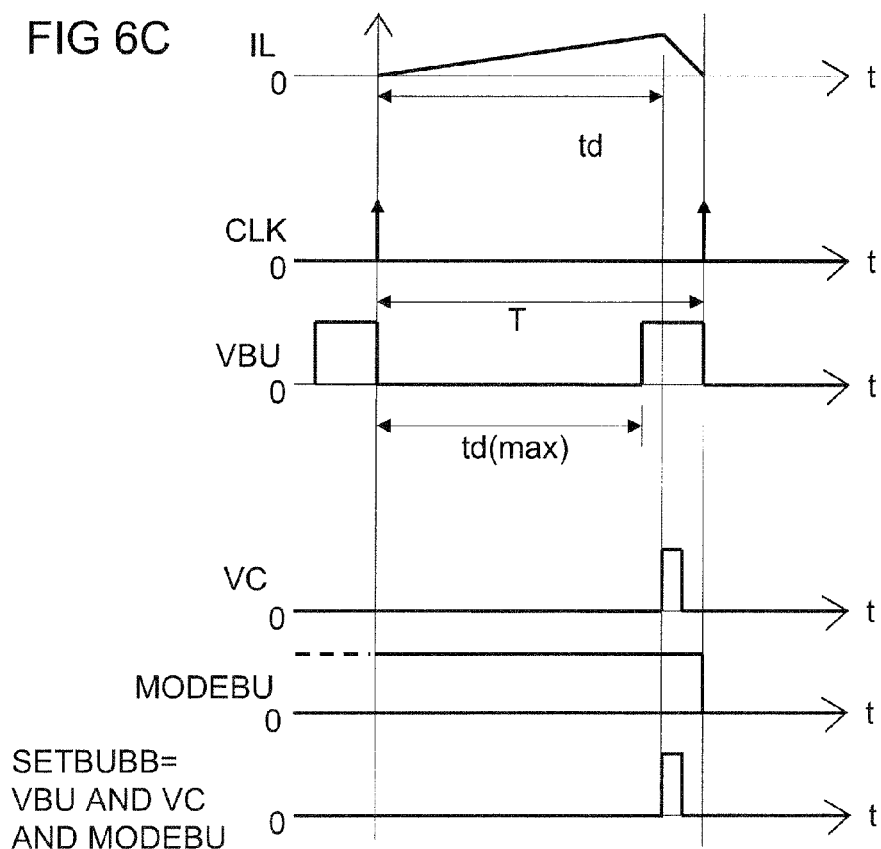

BUCK-BOOST SWITCHING REGULATOR AND METHOD THEREOF FOR DC/DC CONVERSION

RELATED APPLICATIONS

This is a U.S. national stage of application No. PCT/EP2008/058210, filed on Jun. 26, 2008.

This application claims the priority of European application no. 07012511.7 filed Jun. 26, 2007, the entire content of which is hereby incorporated by reference.

FIELD OF THE INVENTION

The present invention relates to a method for DC/DC conversion and to a DC/DC converter arrangement.

DC/DC converter arrangements are commonly used for generating an output voltage for a circuit by up-conversion of a supply voltage or down-conversion of a supply voltage. DC/DC converter arrangements are, for example, used in devices for mobile communication and digital cameras. A DC/DC converter using a Buck mode of operation is used for down-conversion of the supply voltage, whereas a DC/DC converter using a Boost mode of operation is used for up-conversion of the supply voltage. If the supply voltage is nearly about the same as the output voltage, then a Buck-Boost mode of operation can by used.

Document EP 1804368 A1 shows a DC/DC converter with a Buck, a Boost and a Buck-Boost mode of operation.

Document EP 1388927 A2 refers to a Buck-Boost DC/DC switching power conversion.

SUMMARY OF THE INVENTION

It is an object of the present invention to provide a method for DC/DC conversion and a DC/DC converter arrangement which achieve a high flexibility in controlling different modes of operation.

In one embodiment, a method for DC/DC conversion comprises operating in a Boost mode of operation or operating in a Buck-Boost mode of operation. An output voltage is generated from a supply voltage by the DC/DC conversion. The method further comprises switching from the Boost mode of operation to the Buck-Boost mode of operation if a desired value of the output voltage is smaller than a first reference voltage. Furthermore, the method comprises switching from the Buck-Boost mode of operation to the Boost mode of operation if the desired value of the output voltage exceeds a second reference voltage.

It is an advantage of the method that a high flexibility for the control of the conversion is achieved via the first and the second reference voltages, which can be set depending on the application. A first overlap band comprises the voltage range between the first reference voltage and the second reference voltage. If the desired value of the output voltage has a value within the first overlap band, the Boost mode of operation and the Buck-Boost mode of operation are both appropriate for providing the output voltage. If the desired value is outside of the overlap band, the method for DC/DC conversion switches the mode of operation from the Buck-Boost mode to the Boost mode or from the Boost mode to the Buck-Boost mode, respectively.

In an embodiment, the first reference voltage is lower than the second reference voltage.

In an embodiment, the method for DC/DC conversion comprises operating a DC/DC converter arrangement.

In a preferred embodiment, the method for DC/DC conversion comprises operating a DC/DC converter arrangement of the Buck-Boost type.

In an embodiment, the method for DC/DC conversion in addition to the modes described above comprises operating in a Buck mode of operation. Furthermore, the method comprises switching from the Buck-Boost mode of operation to the Buck mode of operation if the desired value of the output voltage falls below a third reference voltage. Further on, the method comprises switching from the Buck mode of operation to the Buck-Boost mode of operation if the desired value of the output voltage exceeds a fourth reference voltage. The fourth reference voltage is lower than the first reference voltage. The third reference voltage is lower than the fourth reference voltage. Thus the DC/DC converter arrangement may also operate in the Buck mode of operation.

In an embodiment, the DC/DC converter arrangement may select any of the three modes of the set of modes comprising the Boost mode, the Buck-Boost mode and the Buck mode of operation.

In an embodiment, the DC/DC converter arrangement may select the maximum of two modes of the set of modes comprising the Boost mode, the Buck-Boost mode and the Buck mode of operation. For example, the DC/DC converter arrangement is able to selectively operate in the Boost mode or the Buck-Boost mode of operation. In this case the DC/DC converter arrangement does not operate in the Buck mode.

In another example, the DC/DC converter arrangement is able to selectively operate in the Buck mode or the Buck-Boost mode of operation. In that case the DC/DC converter arrangement does not operate in the Boost mode.

A supply voltage with small values and also alternatively with large values can be used for generating the output voltage. In the Boost mode of operation the output voltage can be boosted up compared to the supply voltage. In the Buck mode of operation, the output voltage can be stepped down compared to the supply voltage. In the Buck-Boost mode of operation the output voltage can be above, below or equal to the supply voltage. A second overlap band comprises the voltage range between the third and the fourth reference voltages.

In one embodiment, a cycle time T is set for the three modes of operation. The cycle time T and, therefore, a cycle frequency of the DC/DC converter arrangement advantageously is constant during the operation of the DC/DC converter arrangement in one mode of operation and is also constant over different modes of operation.

In one embodiment, the Buck-Boost mode of operation comprises four switching phases, whereas the Boost mode of operation and the Buck mode of operation each comprise only two switching phases. Since the number of switching phases of the Buck-Boost mode of operation is larger than the number of switching phases of the Buck mode and the Boost mode, more losses in the switches occur in the Buck-Boost mode. Therefore, the method advantageously reduces the Buck-Boost region in which the Buck-Boost mode is used to optimize the overall efficiency of the DC/DC converter arrangement. The first overlap band and the second overlap band are also advantageously reduced.

According to an aspect of the invention, a DC/DC converter arrangement comprises an input terminal, an output terminal, and a switching arrangement connected between the input terminal and the output terminal. Further on, the DC/DC converter arrangement comprises a logic circuit which is coupled to the switching arrangement and a mode selection circuit. At an input, the mode selection circuit is coupled to the output terminal of the DC/DC converter arrangement. The mode selection circuit comprises a first output which is connected to the logic circuit and a second output which is also connected to the logic circuit.

A supply voltage is supplied to the input terminal of the DC/DC converter arrangement. An output voltage is provided at the output terminal by the operation of the switching arrangement. The logic circuit controls the switching arrangement. The mode selection circuit generates a Buck-Boost activation signal at the first output of the mode selection circuit. Furthermore, the mode selection circuit generates a Boost activation signal at the second output of the mode selection circuit. The Buck-Boost signal and the Boost signal are provided to the logic circuit.

It is an advantage of the DC/DC converter arrangement that the mode of operation can be set by the mode selection circuit in a very flexible manner. The mode of operation of the switching arrangement depends on the Buck-Boost activation signal and the Boost activation signal. The logic circuit controls the switching arrangement in such a way that a Boost mode of operation is performed by the switching arrangement if the Boost activation signal has a logical high level. Similarly, the logic circuit sets the switching arrangement in a Buck-Boost mode of operation if the Buck-Boost activation signal shows the logical high level. The DC/DC converter arrangement may be designed to operate according to a method for DC/DC conversion.

In an embodiment, the DC/DC converter arrangement is designed to switch from the Boost mode of operation to the Buck-Boost mode of operation, if a desired value of the output voltage is smaller than a first reference voltage and to switch from the Buck-Boost mode of operation to the Boost mode of operation, if the desired value is larger than a second reference voltage.

In one embodiment, the mode selection circuit comprises a third output which is connected to the logic circuit. The mode selection circuit generates a Buck activation signal at the third output of the mode selection circuit. The Buck activation signal is provided to the logic circuit via the third output of the mode selection circuit. The logic circuit sets the switching arrangement in a Buck mode of operation if the Buck activation signal shows the logical high level. Since a DC/DC converter arrangement is able to operate three modes of operation, it is advantageous to reduce the band of operation of the Buck-Boost mode for the reduction of switching losses. This improves the overall efficiency and the dynamic range of the DC/DC converter arrangement.

In an embodiment, the DC/DC converter arrangement is designed to switch from the Buck-Boost mode of operation to the Buck mode of operation, if the desired value is smaller than a third reference voltage and to switch from the Buck mode of operation to the Buck-Boost mode of operation, if the desired value is larger than a fourth reference voltage.

In one embodiment, only one of the three activation signals comprising the Buck-Boost activation signal, the Boost activation signal and the Buck activation signal is at a logical high level at one time. If a mode of operation is set at a start of a present clock cycle, the other activation signals are automatically reset so that only one mode is active and only one of the three activation signals is on the logical high level in the present clock cycle.

The mode selection circuit advantageously generates the Buck-Boost, the Boost and the Buck activation signal depending on a desired value of the output voltage. The mode selection circuit preferably generates the Buck-Boost, the Boost and the Buck activation signal additionally depending on the output voltage.

In an embodiment, the mode selection circuit operates in the present clock cycle and in a next clock cycle which follows the present clock cycle. In an embodiment, the mode selection circuit sets the Buck-Boost activation signal to a logical high level at a start of the next clock cycle, if a desired value of the output voltage is smaller than the first reference value and the Boost activation signal is set to a logical high level in the present clock cycle. Further on, the mode selection circuit sets the Boost activation signal to a logical high level at the start of the next clock cycle, if the desired value of the output voltage is larger than the second reference value and the Buck-Boost activation signal is set to a logical high level in the present clock cycle. Thus the DC/DC converter arrangement operates in the Boost mode of operation or in the Buck-Boost mode of operation.

In a further development, the mode selection circuit additionally sets the Buck-Boost activation signal to a logical high level at the start of the next clock cycle, if the desired value of the output voltage is larger than the fourth reference value and the Buck activation signal is set to a logical high level in the present clock cycle. Moreover, the mode selection circuit sets the Buck activation signal to a logical high level at the start of the next clock cycle, if the desired value of the output voltage is smaller than the third reference value and the Buck-Boost activation signal is set to a logical high level in the present clock cycle. Thus the DC/DC converter arrangement additionally operates in the Buck mode of operation.

In an embodiment, the mode selection circuit comprises a first latch that provides the Buck-Boost activation signal and a second latch that provides the Boost activation signal. In a further development, the mode selection circuit comprises a third latch that provides the Buck activation signal.

BRIEF DESCRIPTION OF THE DRAWINGS

The following description of figures of exemplary embodiments may further illustrate and explain the invention. Devices with the same structure and the same effect, respectively, appear with equivalent reference symbols. Insofar as circuits or devices correspond to one another in terms of their function in different figures, the description thereof is not repeated for each of the following figures.

FIGS. 2A to 2F show an exemplary embodiment of a Buck-Boost mode, a Boost mode and a Buck mode of operation, FIGS. 6A to 6E show another exemplary embodiment of a mode selection circuit.

DETAILED DESCRIPTION OF THE DRAWINGS

Figure 1A:
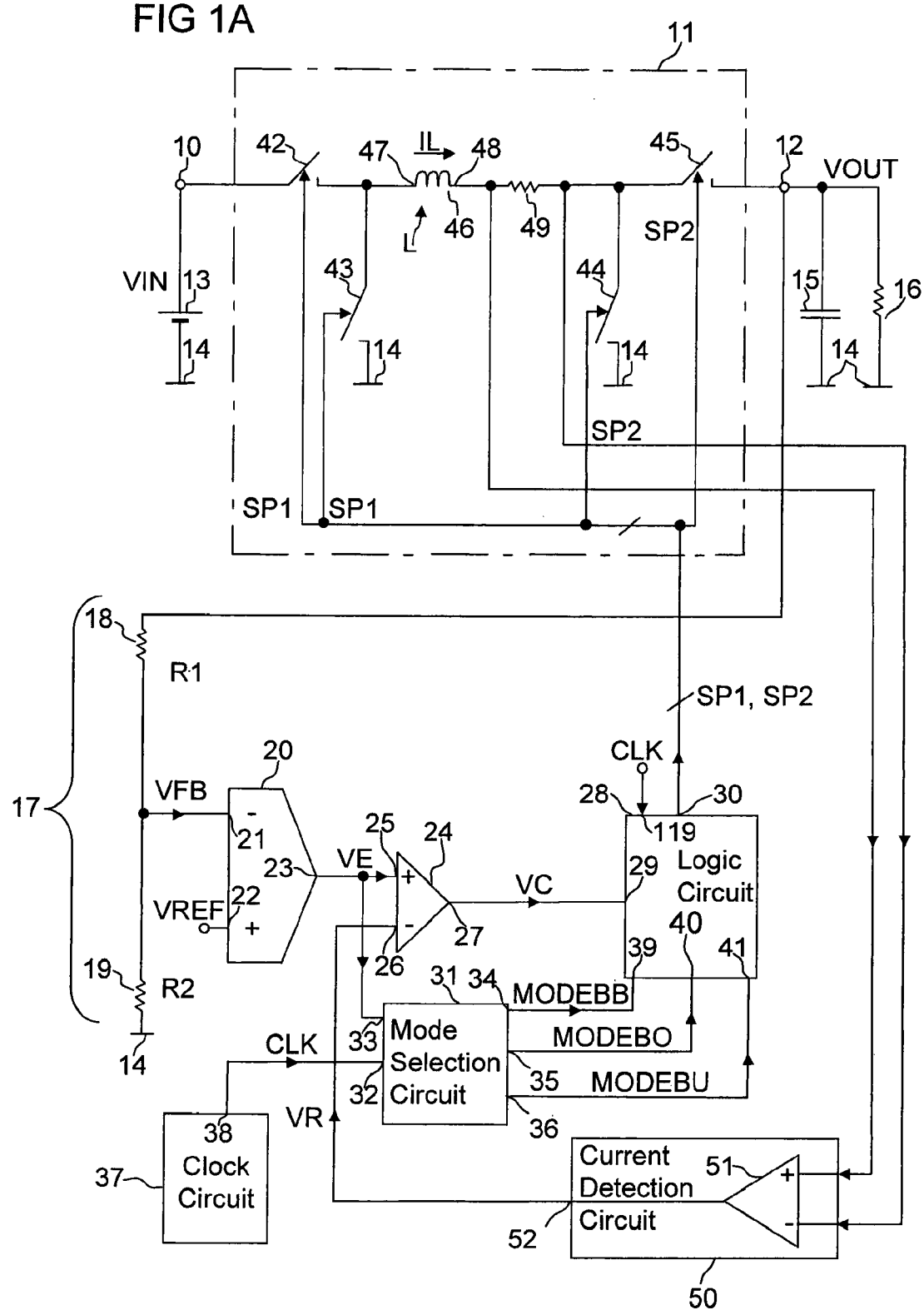
FIGS. 1A and 1B show exemplary embodiments of a DC/DC converter arrangement of the invention.

FIG. 1A shows a first exemplary embodiment of a DC/DC converter arrangement according to the invention. The DC/DC converter arrangement comprises an input terminal 10, a switching arrangement 11 and an output terminal 12. The switching arrangement 11 couples the output terminal 12 to the input terminal 10. A voltage source 13 is arranged between the input terminal 10 and a reference potential terminal 14. An output capacitor 15 couples the output terminal 12 to the reference potential terminal 14. Furthermore, a load resistor 16, which represents a load driven by the DC/DC converter arrangement, is arranged between the output terminal 12 and the reference potential terminal 14. The DC/DC converter arrangement further comprises a first voltage divider 17 which couples the output terminal 12 to the reference potential terminal 14 and has a first and a second voltage divider resistor 18, 19. The first and the second voltage divider resistors 18, 19 are connected in series between the output terminal 12 and the reference potential terminal 14. Further on, the DC/DC converter arrangement comprises an amplifier 20 with a first input 21 which is coupled to a tap between the first voltage divider resistor 18 and the second voltage divider resistor 19. The DC/DC converter arrangement additionally comprises a first comparator 24 with a first input 25 which is connected to an output 23 of the amplifier 20. The DC/DC converter arrangement further comprises a logic circuit 28 with an input 29 which is connected to an output 27 of the first comparator 24. An output 30 of the logic circuit 28 is connected to an input of the switching arrangement 11.

Furthermore, the DC/DC converter arrangement comprises a mode selection circuit 31 with a first clock input 32 which is connected to a first output 38 of a clock circuit 37. An input 33 of the mode selection circuit 31 is coupled to the output terminal 12 via the amplifier 20 and the voltage divider 17. Therefore, the input 33 of the mode selection circuit 31 is connected to the output 23 of the amplifier 20. The mode selection circuit 31 comprises a first and a second output 34, 35. The first output 34 of the mode selection cirsuit 31 is connected to a first mode input 39 of the logic circuit 28. Similarly, the second output 35 of the mode selection circuit 31 is connected to a second mode input 40 of the logic circuit 28. Furthermore, the mode selection circuit 31 comprises a third output 36 which is connected to a third mode input 41 of the logic circuit 28.

The switching arrangement 11 comprises a first, a second, a third and a fourth switch 42 to 45 and a coil 46. The coil 46 can also be named as an inductor. The first switch 42 connects the input terminal 10 to a first terminal 47 of the coil 46. The second switch 43 connects the first terminal 47 of the coil 46 to the reference potential terminal 14. The third switch 44 couples a second terminal 48 of the coil 46 to the reference potential terminal 14. The fourth switch 45 couples the second terminal 48 of the coil 46 to the output terminal 12. The output 30 of the logic circuit 28 is coupled to each of the control terminals of the four switches 42 to 45. The switching arrangement 11 furthermore comprises a series resistor 49 which is connected in series to the coil 46. A first terminal of the resistor 49 is connected to the coil 46 and a second terminal of the resistor 49 is connected to the fourth switch 45. The first and the second terminals of the series resistor 49 are coupled to two inputs of a current detection circuit 50. The current detection circuit 50 comprises a further amplifier 51 which is coupled on its input side to the first and the second terminal of the series resistor 49. A non-inverting terminal of the further amplifier 51 is connected to the first terminal and an inverting terminal of the further amplifier 51 is connected to the second terminal of the series resistor 49. The further amplifier 51 is connected on its output side to a second input 26 of the first comparator 24 via an output 52 of the current detection circuit 50.

The mode selection circuit 31 generates a Buck-Boost activation signal MODEBB and applies it to the first mode input 39 of the logic circuit 28 via the first output 34 of the mode selection circuit 31. Furthermore, a Boost activation signal MODEBO is provided by the mode selection circuit 31 and is applied to the second mode input 40 of the logic circuit 28 via the second output 35 of the mode selection circuit 31.

In addition, the mode selection circuit 31 generates a Buck activation signal MODEBU at its output 36. The Buck activation signal MODEBU is provided to the third mode input 41 of the logic circuit 28. The logic circuit 28 controls the switching arrangement 11. Therefore, the logic circuit 28 sets the mode of operation of the switching arrangement 11. The control of the mode of operation of the switching arrangement 11 depends on the activation signals provided to the logic circuit 28. The logic circuit 28 sets a Buck-Boost mode of operation of the switching arrangement 11 if the Buck-Boost activation signal MODEBB is set or sets a Boost mode of operation of the switching arrangement 11 if the Boost activation signal MODEBO is set. In a corresponding way, the logic circuit 28 sets the switching arrangement 11 in a Buck mode of operation if the Buck activation signal MODEBU is set.

A supply voltage VIN is applied to the input terminal 10 via the voltage source 13. An output voltage VOUT is provided at the output terminal 12 by the switching arrangement 11. A feedback voltage VFB is generated depending on the output voltage VOUT trough the voltage divider 17. The feedback voltage VFB is provided at the tap between the first and the second voltage divider resistor 18, 19. The feedback voltage VFB is provided to the first input 21 of the amplifier 20, whereas a reference voltage VREF is provided to a second input 22 of the amplifier 20. A difference between the feedback voltage VFB and the reference voltage VREF is amplified by the amplifier 20 and provided in the form of an error voltage VE at the output 23 of the amplifier 20.

The feedback voltage VFB can be approximately calculated according to the following equation:

$$VFB = VOUT \cdot \frac{R2}{R1 + R2} = \alpha \cdot VOUT \text{ with } \alpha = \frac{R2}{R1 + R2}$$

wherein VOUT is the value of the output voltage, R1 is a value of the first divider resistor 18, R2 is a value of the second divider resistor 19, and α is a divider factor of the first voltage divider 17.

Since the first input 21 of the amplifier 20 is designed as an inverting input and the second input 22 of the amplifier 20 is designed as a non-inverting input, the error voltage VE can be approximately calculated according to the following equation:

$$VE = \beta \cdot (VREF - VFB) = \beta \cdot (VREF - \alpha \cdot VOUT),$$

wherein VREF is the reference voltage and p is an amplification factor of the amplifier 20.

A desired value VOUTR of the output voltage VOUT which shall be provided at the output terminal 12 can be approximately determined by the equation:

$$VOUTR = \frac{VREF}{\alpha},$$

wherein VREF is the reference voltage and α is the divider factor of the first voltage divider 17. A comparator signal VC is generated depending on the error voltage VE. The error voltage VE is supplied to the first input 25 of the first comparator 24, so that the comparator signal VC is supplied at the output 27 of the first comparator 24. The comparator signal VC is applied to the input 29 of the logic circuit 28. A clock signal CLK which is provided by the clock circuit 37 at the first output 38 is also supplied to the logic circuit 28 via a clock input 119 of the logic circuit 28. A first and a second control signal SP1, SP2 are provided depending on the comparator signal VC, the Buck-Boost activation signal MODEBB, the Boost activation signal MODEBO, the Buck activation signal MODEBU and the clock signal CLK. The first and the second control signals SP1, SP2 are generated by the logic circuit 28 and provided via the output 30 of the logic circuit 28 to the first to the fourth switch 42 to 45.

A coil current IL flows through the coil 46 and, therefore, also through the series resistor 49. Therefore, a voltage difference between the first and the second terminal of the series resistor 49 is generated which is provided to the current detection circuit 50. The further amplifier 51 amplifies the difference between the voltage at the first and the voltage at the second terminal of the series resistor 49 and provides a sense voltage VR at the output 52 of the current detection circuit 50. An absolute value of the sense voltage VR is linearly proportional to the coil current IL. The sense voltage VR is provided to the second input 26 of the first comparator 24. Therefore, the comparator signal VC is generated depending on the difference between the error voltage VE and the sense voltage VR according to the following equation:

$$VC=1, \text{ if } VE-VR=VE+k\cdot IL>0,$$

wherein 1 represents the logical high level and k is an amplification factor of the further amplifier 51. The clock circuit 37 provides the clock signal CLK to the first clock input 32 of the mode selection circuit 31 via the output 38 of the clock circuit 37.

The DC/DC converter arrangement can automatically set the three activation signals MODEBB, MODEBU, MODEBO via the mode selection circuit 31 without an external circuitry.

In an embodiment, the first and the fourth switch 42, 45 are designed as p-channel field-effect transistors and the second and the third switch 43, 44 are designed as n-channel field-effect transistors.

The amplifier 20 can be an instrumentation amplifier. Alternatively, the amplifier 20 can be an operational amplifier or an operational transconductance amplifier, abbreviated OTA.

In an alternative, not shown embodiment, the series resistor 49 is replaced by a connection line and the coil current IL is measured via a measurement of a current flowing through the first switch 42.

In an alternative, not shown embodiment, the input 33 of the mode selection circuit 31 is connected to the tap between the first voltage divider resistor 18 and the second voltage divider resistor 19. Thus the feedback voltage VFB is applied to the input 33 of the mode selection circuit 31.

The function of the devices and elements shown in FIG. 1A are further explained below together with FIGS. 2A to 2F.

Figure 1B:
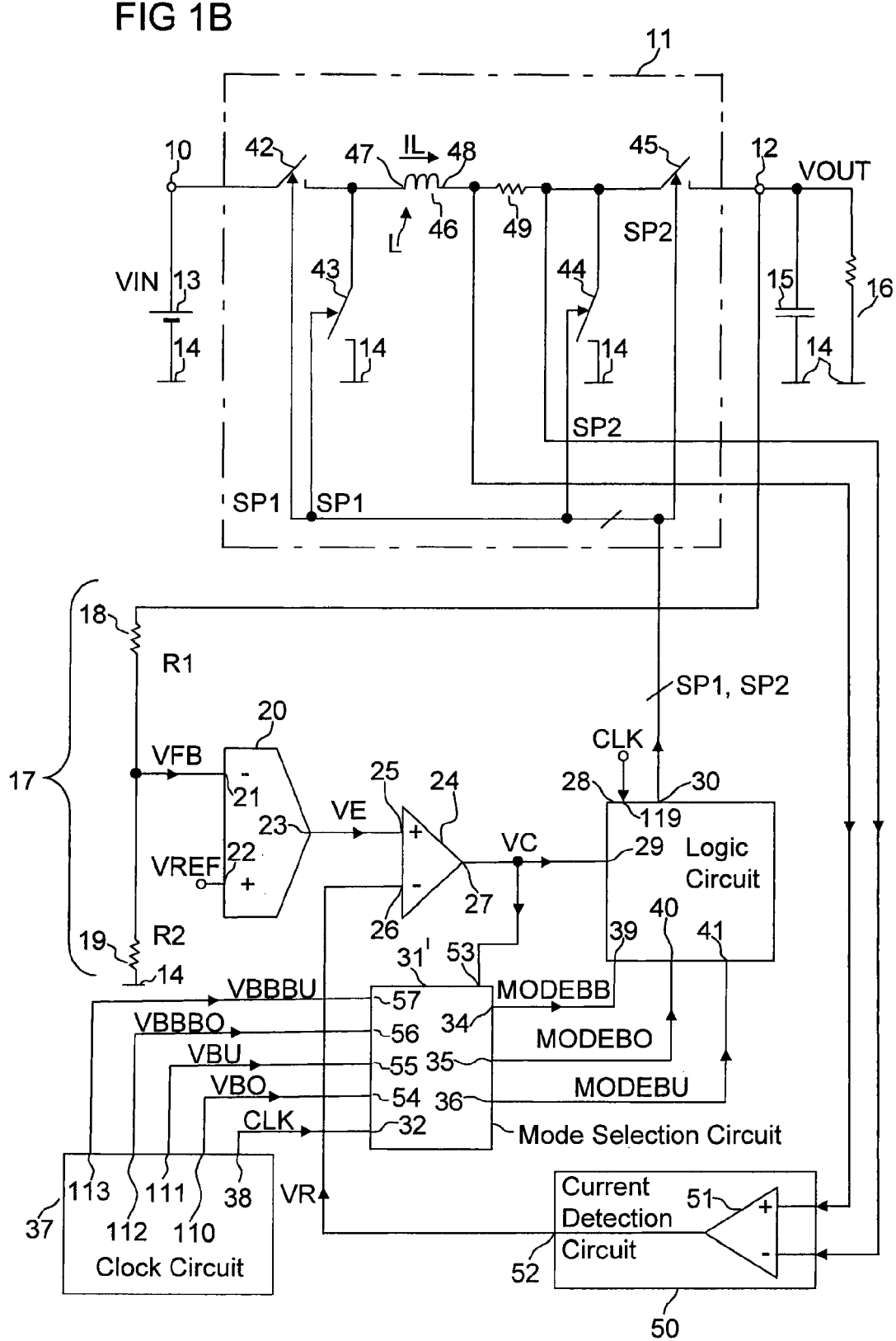

FIG. 1B shows an alternative exemplary embodiment of a DC/DC converter arrangement of the invention which is based on FIG. 1A. The mode selection circuit 31' according to FIG. 1B is not directly connected to the output 23 of the amplifier 20 via the input 33 of the mode selection circuit 31'. The mode selection circuit 31', however, comprises a further input 53 which is coupled to the output terminal 12. The further input 53 is connected to the output 27 of the first comparator 24. The mode selection circuit 31' furthermore comprises a second, a third, a fourth and a fifth clock input 54 to 57 which are connected to a second, a third, a fourth and a fifth output 110 to 113 of the clock circuit 37.

The comparator signal VC is provided to the further input 53 of the mode selection circuit 31'. The clock circuit 37 generates a Boost clock signal VBO, a Buck clock signal VBU, a Buck-Boost-to-Boost clock signal VBBBO and a Buck-Boost-to-Buck clock signal VBBBU, which are provided to the second to the fifth clock inputs 54 to 57 of the mode selection circuit 31'. The mode selection circuit 31' generates the Buck-Boost activation signal MODEBB, the Boost activation signal MODEBO and the Buck activation signal MODEBU depending on the comparator signal VC, the clock signal CLK, the Boost clock signal VBO, the Buck clock signal VBU, the Buck-Boost-to-Boost clock signal VBBBO and the Buck-Boost-to-Buck clock signal VBBBU.

Figures 2A, 2B:
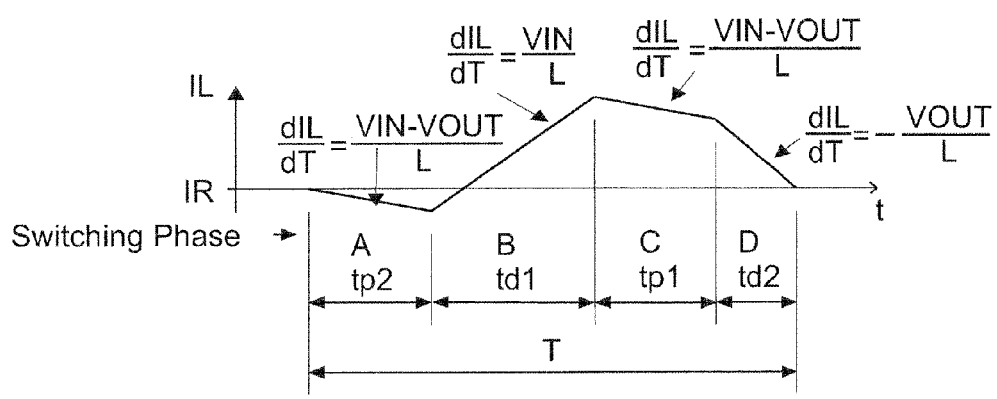

FIG. 2A shows an exemplary embodiment of a control sequence having four switching phases A, B, C, D for a conversion via a Buck-Boost mode of operation. The switching scheme of FIG. 2A can be applied to a circuit as shown in FIGS. 1A and 1B. The first and the fourth switch 42, 45 are in an on-state during a first switching phase A. The second and the third switch 43, 44 are in an off-state during the first switching phase A. The first and the third switch 42, 44 are in an on-state during a second switching phase B, while the second and the fourth switch 43, 45 are in an off-state. The first and the fourth switch 42, 45 are in an on-state during a third switching phase C, whereas the second and the third switch 43, 44 are in an off-state. The second and the fourth switch 43, 45 are in an on-state in a fourth switching phase D, while the first and the third switch 42, 44 are in an off-state. The second switching phase B lasts for a first controllable duration td1, while the fourth switching phase D lasts for a second controllable duration td2. The third switching phase C comprises a first predetermined duration tp1 and the first switching phase A comprises a second predetermined duration tp2. The first control signal SP1 is low during the first, the second and the third phase A, B, C and high during the fourth switching phase D. The second control signal SP2 is low during the first, the third and the fourth switching phase A, C, D, whereas the second control signal SP2 is high in the second switching phase B.

FIG. 2B shows the coil current IL schematically as a function of time t with reference to a reference current level IR during the sequence described in the table of FIG. 2A. A complete cycle having a cycle time T is shown. The cycle time T is the sum of the first and of the second predetermined duration tp1, tp2 and of the first and the second controllable duration td1, td2. During the first switching phase A, the coil current IL flows from the supply terminal 10 to the output terminal 12. The output voltage VOUT increases as the coil current IL charges the capacitor 15. During the first switching phase A, the slope of the coil current IL, that is the derivative with respect to time t of the coil current IL, equals the voltage drop across the coil 46 divided by an inductance L of the coil 46. The voltage drop across the coil 46 is the value of the supply voltage VIN reduced by the value of the output voltage VOUT in the first switching phase A. In the Buck-Boost mode, the output voltage VOUT is in the same voltage range as the supply voltage VIN, therefore, the slope is nearly zero during the first switching phase A. During the second switching phase B, the coil current IL increases because energy is supplied to the coil 46, as the first terminal 47 of the coil 46 is directly connected to the voltage source 13 and the second terminal 48 of the coil 46 is directly connected to the reference potential terminal 14 via the first and the third switch 42, 44, respectively. During the second switching phase B, the coil current IL rises with a slope which corresponds to the value of the supply voltage VIN divided by the inductance L.

In the third switching phase C, the first and the fourth switch 42, 45 are closed so that the first terminal 47 of the coil 46 is connected to the voltage source 13 and the second terminal 48 of the coil 46 is connected to the output terminal 12. The coil current IL is nearly constant in the third switching phase C because the slope of coil current IL is the voltage difference between supply voltage VIN and output voltage VOUT divided by the inductance L. During the third and the fourth switching phases C, D, the coil current IL charges the output capacitor 15. The coil current IL decreases in the fourth switching phase D because energy is supplied to the output terminal 12, including the output capacitor 15. The slope of the decrease of the coil current IL is defined by the negatived value of the output voltage VOUT divided by the inductance L. The switching phases A, B, C and D are repeated periodically to generate a stable output voltage VOUT. The output capacitor 15 will be charged by the coil current IL and is used as an energy supply for a load of the DC/DC converter arrangement represented by the load resistor 16 in FIGS. 1A and 1B.

The output capacitor 15 is advantageously charged during three of the four switching phases. It is an advantage that the Buck-Boost of operation comprises the first and the third switching phases A, C with durations which do not vary and are constant during the operation in a Buck-Boost mode. In addition, the Buck-Boost mode of operation comprises the second switching phase B with the first controllable duration td1 which can be varied to achieve a small value of the error voltage VE. The comparator signal VC controls the first controllable duration td1. Since the sum of the durations of the four switching phases A, B, C, D of the Buck-Boost mode is the cycle time T which is also constant, the last switching phase of a clock cycle, which is the fourth switching phase D, lasts for the second controllable duration td2 which can be derived by the values of the cycle time T, the first controllable duration td1 and the first and the second predetermined durations tp1, tp2.

FIG. 2C shows an exemplary control sequence for the Boost mode of operation of the DC/DC converter arrangement shown in FIGS. 1A and 1B. The control sequence comprises two switching phases, the first switching phase A and the second switching phase B of the sequence shown in the table in FIG. 2A. The two switching phases A, B are repeated periodically. During the second switching phase B, the first and the third switch 42, 44 are closed and, therefore, energy is supplied to the coil 46 from the voltage source 13. In the following first switching phase A, energy is provided to the output terminal 12 from the coil 46, because the first and the fourth switch 42, 45 are closed. The coil current IL can flow to the output capacitor 15 in the first switching phase A even if the output voltage VOUT is higher than the supply voltage VIN.

FIG. 2D shows the coil current IL during the Boost mode of operation with the sequence described in the table of FIG. 2C. During the second switching phase B, the coil current IZ increases since the slope VIN divided by the inductance L is positive. During the first switching phase A, the coil current IL falls again. The second switching B lasts for a Boost duration tu in the Boost mode of operation. The comparator signal VC controls the Boost duration tu.

FIG. 2E shows an exemplary control sequence for down-conversion using a Buck mode of operation of the DC/DC converter arrangement shown in FIGS. 1A and 1B. For down-conversion, the first and the fourth switching phase A, D, already described in the table in FIG. 2A, are preferably used. During the first switching phase A, energy is provided by the voltage source 13 to the coil 46 and to the output capacitor 15 at the output terminal 12. During the fourth switching phase D, the voltage source 13 is decoupled from the coil 46 and energy is provided to the output terminal 12 by the coil 46 only.

FIG. 2F shows an example of the coil current IL versus time t with reference to the current reference level IR during the Buck mode of operation with the sequence described in the table of FIG. 2E. The coil current IL rises during the first switching phase A and falls during the fourth switching phase D. The first switching phase A during the Buck mode of operation lasts for a Buck duration td. The comparator signal VC controls the Buck duration td.

Figure 3:
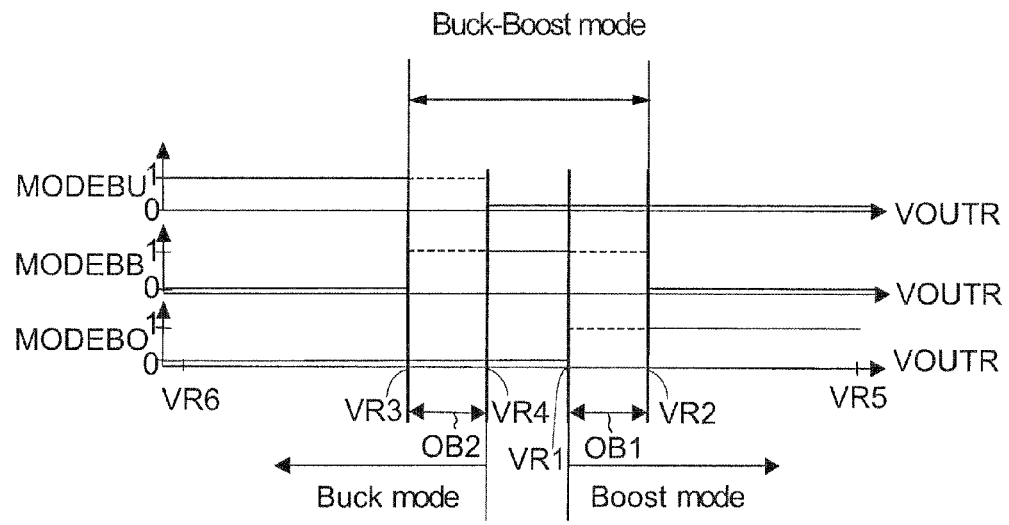
FIG. 3 shows an example of activation signals as a function of an output voltage.

FIG. 3 shows the different modes of operation of the DC/DC converter arrangement with reference to the desired value VOUTR of the output voltage VOUT. The Boost mode of operation is appropriate if the desired value VOUTR of the output voltage VOUT is larger than a first reference voltage VR1 and lower than a fifth reference voltage VR5. Therefore, the Boost activation signal MODEBO may attain a logical high value in an interval between the first reference voltage VR1 and the fifth reference voltage VR5.

The Buck-Boost mode of operation can be used if the desired value VOUTR of the output voltage VOUT is smaller than a second reference voltage VR2 and larger than a third reference voltage VR3. The Buck-Boost activation signal MODEBB can obtain, therefore, a logical high value in an interval between the third reference voltage VR3 and the second reference voltage VR2.

The Buck mode of operation can be used if the desired value VOUTR of the output voltage VOUT is smaller than a fourth reference voltage VR4 and exceeds a sixth reference voltage VR6. Therefore, the Buck activation signal MODEBU may have a logical high value in an interval between the sixth reference voltage VR6 and the fourth reference voltage VR4. The fifth reference voltage VR5 is larger than the first and the second reference voltages VR1, VR2. The second reference voltage VR2 is larger than the first, the third and the fourth reference voltages VR1, VR3, VR4. The first reference voltage VR1 exceeds the third and the fourth reference voltages VR3, VR4. The fourth reference voltage VR4 is larger than the third and the sixth reference voltages VR3, VR6. The third reference voltage VR3 is larger than the sixth reference voltage VR6. The first reference voltage VR1 sets a lower limit of the Boost mode. Further on, the fourth reference voltage VR4 sets a higher limit of the Buck mode.

The following approximate equations are used for the control scheme in the Buck-Boost mode:

$$VOUT = VIN \cdot \frac{td1 + tp1 + tp2}{td2 + tp1 + tp2} \text{ and } T = td1 + td2 + tp1 + tp2,$$

wherein VOUT is the output voltage, VIN is the supply voltage, td1 is the first controllable duration, td2 is the second controllable duration, tp1 is the first predetermined duration, tp2 is the second predetermined duration and T is the cycle time. The first and the second predetermined durations tp1, tp2 obtain predetermined constant values. The sum of the first and the second predetermined duration tp1+tp2 can have any value from zero to the cycle time T. The first controllable duration td1 obtains values from td1[min] to td1[max] and the second controllable duration td2 obtains values from td2[max] to td2[min]. The output voltage VOUT may approximately obtain values from the second reference voltage VR2 to the third reference voltage VR3 according to the following equations:

$$VR2 = VIN \cdot \frac{td1[\max] + tp1 + tp2}{td2[\min] + tp1 + tp2} \text{ and}$$

$$VR3 = VIN \cdot \frac{td1[\min] + tp1 + tp2}{td2[\max] + tp1 + tp2}$$

The above band is fully controllable with the values of the sum of the first and the second predetermined durations tp1, tp2. The above band can be reduced by increasing the sum of the first and the second predetermined durations tp1+tp2. The increase of the sum of the first and the second predetermined time durations tp1+tp2 leads to a decrease of the sum of the first and the second controllable durations td1+td2.

In the Boost mode of operation, the output voltage VOUT can be approximately calculated according to the following equation:

$$VOUT = VIN \cdot \frac{T}{T - tu},$$

wherein tu is the Boost duration. The Boost duration tu obtains values from tu[min] to tu[max], so that the output voltage VOUT may approximately attain values from a first reference voltage VR1 to the fifth reference voltage VR5 according to the following equations:

$$VR1 = VIN \cdot \frac{T}{T - tu[\min]} \text{ and } VR5 = VIN \cdot \frac{T}{T - tu[\max]}$$

In the Buck mode of operation, the output voltage VOUT can approximately be calculated according to the following equation:

$$VOUT = VIN \cdot \frac{td}{T},$$

wherein td is the Buck duration. As the Buck duration td attains values from td[min] to td[max], the output voltage VOUT may approximately attain values from the fourth reference voltage VR4 to the sixth reference voltage VR6.

$$VR4 = VIN \cdot \frac{td[\max]}{T} \text{ and } VR6 = VIN \cdot \frac{td[\min]}{T}$$

It is an advantage that the second reference voltage VR2 is larger than the first reference voltage VR1 and, therefore, a transition between the Boost mode and the Buck-Boost mode of operation is possible. Since the fourth reference voltage VR4 is larger than the third reference voltage VR3, a transition of the Buck mode to the Buck-Boost mode of operation and reverse is also possible. FIG. 3 shows a first overlap band OB1 between the first and the second reference voltages VR1, VR2 and a second overlap band OB2 between the third and the fourth reference voltage VR3, VR4. The first overlap band OB1 which exists between the Boost mode and the Buck-Boost mode of operation can be given approximately according to the following equation:

$$OB1 = VR2 - VR1$$
$$= VIN \cdot \frac{td1[\max] + tp1 + tp2}{td2[\min] + tp1 + tp2} - VIN \cdot \frac{T}{T - tu[\min]}$$

The maximum value td1[max] and the minimum value td1[min] of the first controllable duration can be approximately calculated according to the following equation:

$td1[\max]=T-tp1-tp2-td2[\min]$ and $td1[\min]=T-tp1-tp2-td2[\max]$

If a value for the desired first overlap band OB1 and the values of the minimum of the Boost duration tu[min], of the minimum of the second controllable duration td2[min] and of the cycle time T are known, then the sum of the first and the second predetermined time tp1+tp2 can be calculated according to the two equations above as a function of the supply voltage VIN.

Similarly, the second overlap band OB2 which exists between the Buck mode and the Buck-Boost mode of operation is approximately given by the following equation:

$$OB2 = VR4 - VR3 = VIN \cdot \frac{td[\max]}{T} - VIN \cdot \frac{td1[\min] + tp1 + tp2}{td2[\max] + tp1 + tp2}$$

By means of the equations above, a value for the desired second overlap band OB2 and the values of the Buck duration td[max], of the minimum of the first controlling duration td1[min] and of the cycle time T the value of the sum of the first and the second predetermined durations tp1+tp2 can be calculated as a function of the supply voltage VIN.

In a preferred embodiment, the smaller one of the two values of the sum of the predetermined durations tp1, tp2 is used wherein the two values are derived by the calculation for the first overlap band OB1 between Boost and Buck-Boost mode and the second overlap band OB2 between Buck and Buck-Boost mode. The smaller of the two values for the sum of the predetermined durations tp1+tp2 corresponds to the wider overlap band and assures continuous operation between different modes. Following the above calculations, the values for the sum of the first and the second predetermined durations tp1+tp2, the maximum value of the first controllable duration td1[max] and the maximum value of the second controllable duration td2[max] can be achieved. Since these values, the minimum and the maximum values of the Boost duration tu, the minimum and the maximum values of the Buck duration td and the minimum values of the first and the second controllable durations td1, td2 of the Buck-Boost mode are known, the transition between the different modes of operation can be performed dynamically as shown in FIGS. 6A to 6E. The Boost duration tu, the Buck duration td and the first controllable duration td1 of the Buck-Boost mode, respectively, are controlled via the comparator signal VC.

Figure 4:
FIG. 4 shows an exemplary clock cycle.

FIG. 4 shows a clock cycle as a function of time T. The duration of a clock cycle is the cycle time T.

Figure 5:
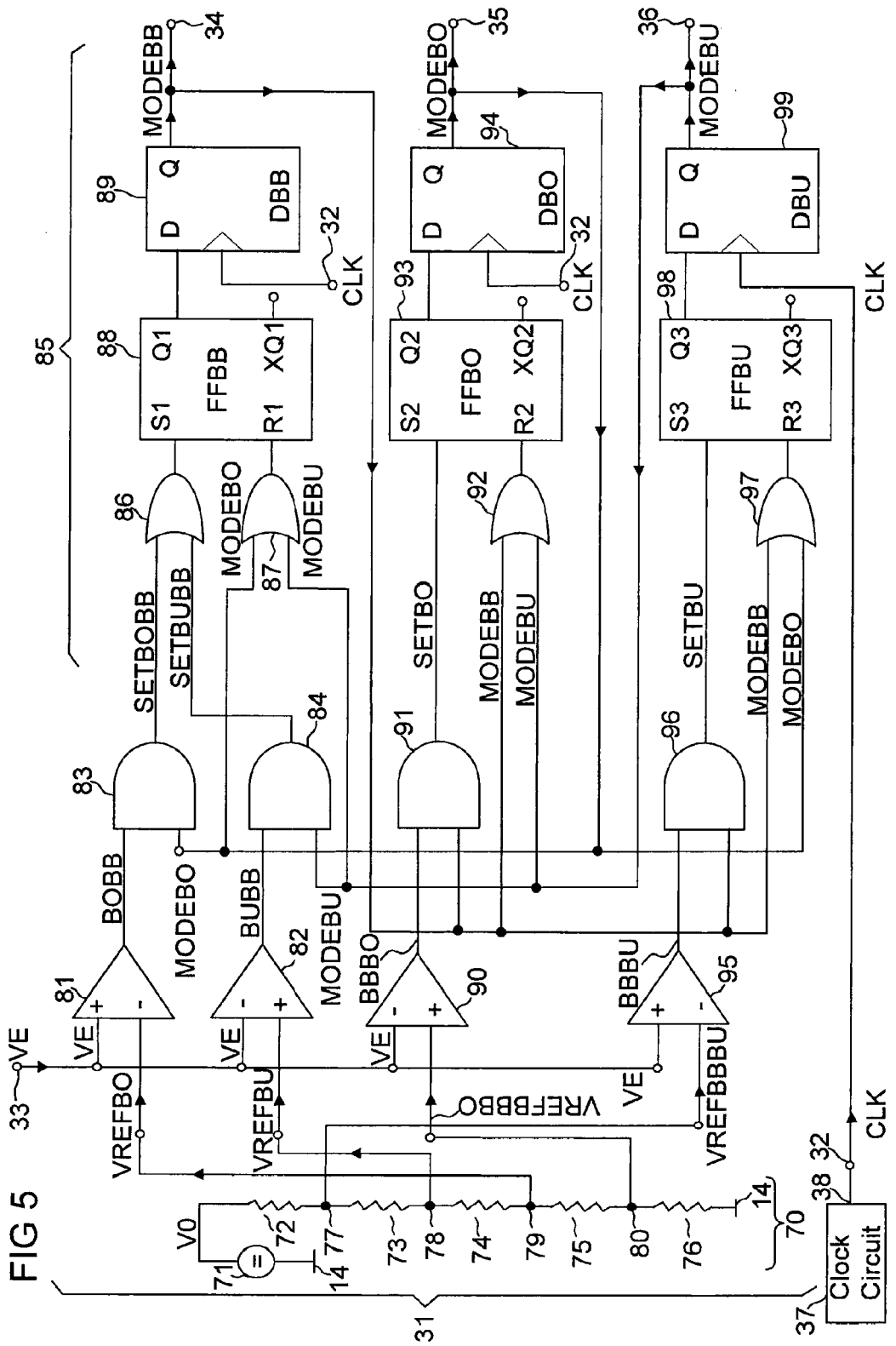
FIG. 5 shows an exemplary embodiment of a mode selection circuit.

FIG. 5 shows an exemplary embodiment of a mode selection circuit 31 which can be inserted into the DC/DC converter arrangement shown in FIG. 1A. The mode selection circuit 31 comprises a further voltage divider 70 which is arranged between a constant voltage source 71 and the reference potential terminal 14. The further voltage divider 70 comprises five resistors 72 to 76 which are connected in series between the constant voltage source 71 and the reference potential terminal 14. The further voltage divider 70 comprises a first, a second, a third and a fourth tap 77 to 80 which are arranged between the five resistors 72 to 76. The mode selection circuit 31 further comprises a second comparator 81, a third comparator 82, a first AND gate 83, a second AND gate 84 and a digital circuit 85. The digital circuit 85 comprises a first OR gate 86 and a second OR gate 87, a first flip-flop 88 and a first latch 89. A non-inverting input of the second comparator 81 and an inverting input of the third comparator 82 are connected to the output 23 of the amplifier 20, which is shown in FIG. 1A, via the input 33 of the mode selection circuit 31. An inverting input of the second comparator 81 is connected to the third tap 79 which is the tap of the further voltage divider 70 which is the third nearest tap to the constant voltage source 71. A non-inverting input of the third comparator 82 is connected to the second tap 78 which is the tap of the further voltage divider 70 which is the second nearest tap to the constant voltage source 71. As an output of the second comparator 81 is connected to an input of the first AND gate 83, an output of the third comparator 82 is connected to an input of the second AND gate 84. An output of the first AND gate 83 and an output of the second AND gate 84 are connected to the two inputs of the first OR gate 86. An output of the first OR gate 86 is connected to a set input of the first flip-flop 88. The second output 35 of the mode selection circuit 31 is connected to a second input of the first AND gate 25 and to an input of the second OR gate 87. The third output 36 of the mode selection circuit 31 is connected to a second input of the second AND gate 84 and to a further input of the second OR gate 87. An output of the second OR gate 87 is connected to a reset input of the first flip-flop 88. An output of the first flip-flop 88 is connected to a data input of the first latch 89. A clock input of the first latch 89 is connected to the output 38 of the clock circuit 37 via the first clock input 32. An output of the first latch 89 is connected to the first output 34 of the mode selection circuit 31.

Furthermore, the mode selection circuit 31 comprises a fourth comparator 90 and a third AND gate 91. The digital circuit 85 further comprises a third OR gate 92, a second flip-flop 93 and a second latch 94. An inverting input of the fourth comparator 90 is connected to the output 23 of the amplifier 20 via the input 33. A non-inverting input of the fourth comparator 90 is connected to the fourth tap 80 of the further voltage divider 70 which is the fourth nearest tap to the constant voltage source 71. The two inputs of the third AND gate 91 are connected to an output of the fourth comparator 90 and to the first output 34 of the mode selection circuit 31. An output of the third AND gate 91 is connected to a set input of the second flip-flop 93. The third OR gate 92 is connected on its input side to the first and the third output 34, 36 of the mode selection circuit 31. An output of the third OR gate 92 is connected to a reset input of the second flip-flop 93. An output of the second flip-flop 93 is connected to a data input of the second latch 94. A clock input of the second latch 94 is connected to the output 38 of the clock circuit 37 via the first clock input 32. An output of the second latch 94 is connected to the second output 35 of the mode selection circuit 31.

Further on, the mode selection circuit 31 comprises a fifth comparator 95 and a fourth AND gate 96. The digital circuit 85 furthermore comprises a fourth OR gate 97, a third flip-flop 98 and a third latch 99. The fifth comparator 95 is connected at a non-inverting input to the output 23 of the amplifier 20 via the input 33. An inverting input of the fifth comparator 95 is connected to the first tap 77 of the further voltage divider 70 which is the nearest tap to the constant voltage source 71. The fourth AND gate 96 is connected on its input side to an output of the fifth comparator 95 and to the first output 34 of the mode selection circuit 31. The fourth OR gate 97 is connected on its input side to the first and to the second output 34, 35 of the mode selection circuit 31. A set input of the third flip-flop 98 is connected to an output of the fourth AND gate 96, as a reset input of the third flip-flop 98 is connected to an output of the fourth OR gate 97. A data output of the third flip-flop 98 is connected to a data input of the third latch 99. A clock input of the third latch 99 is connected to the output 38 of the clock circuit 37 via the first clock input 32. An output of the third latch 99 is connected to the third output 36 of the mode selection circuit 31. The first, second and third flip-flop 88, 93, 98 can be realized as RS flip-flops. The first, second and third latch 89, 94, 99 can be designed as D flip-flops.

The further voltage divider 70 provides four reference voltages. The lowest but one of the four reference voltages is provided at the third tap 79 and is a Boost reference voltage VREFBO, which corresponds to the first reference voltage VR1. The relation of the Boost reference voltage VREFBO and the first reference voltage VR1 is approximately given by the following equation:

$$VREFBO = \beta \cdot (VREF - \alpha \cdot VR1),$$

wherein VREF is the reference voltage, $\beta$ is the amplification factor of the amplifier 20 and $\alpha$ is the divider factor of the first voltage divider 17. The Boost reference voltage VREFBO is provided to the inverting input of the second comparator 81. The highest but one reference voltage is tapped off at the second tap 78 and is the Buck reference voltage VREFBU which corresponds to the fourth reference voltage VR4 by means of the following equation:

$$VREFBU = \beta \cdot (VREF - \alpha \cdot VR4)$$

The Buck reference voltage VREFBU is provided to the non-inverting input of the third comparator 82. The second comparator 81 generates a second comparator signal BOBB which depends on the difference of the error voltage VE and the Boost reference signal VREFBO. Correspondingly, a third comparator output voltage BUBB is provided at the output of the third comparator 82 and depends on the difference of the Buck reference voltage VREFBU and the error voltage VE. The first AND gate 83 provides a first set signal SETBOBB depending on the second comparator output signal BOBB and the Boost activation signal MODEBO. In a similar way, the second AND gate 84 generates a second set signal SETBUBB which depends on the third comparator output signal BUBB and the Buck activation signal MODEBU. The set input of the first flip-flop 88 receives a signal with a logical high level if the first and/or the second set signal SETBOBB, SETBUBB are on a logical high level. The Boost activation signal MODEBO and the Buck activation signal MODEBU are provided to the second OR gate 87 so that the reset input of the first flip-flop 88 receives a signal with a logical high level, if the Boost or the Buck activation signal MODEBO, MODEBU are on a logical high level. In case that the DC/DC converter arrangement is in a Buck or a Boost mode of operation, the data output of the first flip-flop 88 takes over a logical high level at the set input of the first flip-flop 88. The output signal at the output of the first flip-flop 88 is provided to the data input of the first latch 89. Therefore, with a rising edge of a next clock cycle which is the next clock cycle relative to a present clock cycle of the clock signal CLK, which is provided to the clock input of the first latch 89, the output of the first latch 89 takes over the information at the data input of the first latch 89 and sets the Buck-Boost activation signal MODEBB to a logical high level. Therefore, the Buck-Boost activation signal MODEBB can only be set if the DC/DC converter arrangement is in a Buck mode or in a Boost mode of operation. Furthermore, the Buck-Boost activation signal MODEBB can be set, if at all only a first or a second set signal SETBOBB, SETBUBB is provided. The first set signal SETBOBB is provided if the error voltage VE is larger than the Boost reference voltage VREFBO. Correspondingly, the second set signal SETBUBB is provided if the error voltage VE is smaller than the Buck reference voltage VREFBU. This means the Buck-Boost mode of operation is set if at all only the error voltage VE is in a range between the Boost and the Buck reference voltages VREFBO, VREFBU. This is in agreement with the information provided by FIG. 3 which shows that the Buck-Boost mode of operation can in principle be used between the third and the second reference voltage VR3, VR2. However, the Buck-Boost mode of operation is preferably used only between the first and the fourth reference voltages VR1, VR4 to decrease the voltage range in which the Buck-Boost mode is used for avoiding switching losses. Once the Buck-Boost activation signal MODEBB is set, it continues until the Buck activation signal MODEBU or the Boost activation signal MODEBO will be set and will trigger the reset input of the first flip-flop 88.

The Boost duration to achieves the value tu[min] if the Boost reference signal VREFBO equals the value of the error voltage VE. The second comparator signal BOBB at the output of the second comparator 81 is on a logical high level if the error voltage VE is larger than the Boost reference voltage VREFBO. Due to the first AND gate 83, the first set signal SETBOBB is only on a logical high level if the second comparator output signal BOBS and the Boost activation signal MODEBO are on a logical high level. The first set signal SETBOBB is provided to the set input of the first flip-flop 88 via the first OR gate 86. The output of the first flip-flop 88 sets the Buck-Boost activation signal MODEBB at the start of the next clock cycle via the first latch 89.

The Buck duration td achieves the maximum value td[max] if the Buck reference signal VREFBU equals the error voltage VE. The third comparator output signal BUBB is on a logical high level if the error voltage VE is lower than the Buck reference voltage VREFBU. The second set signal SETBUBB is on a logical high level only if the third comparator output signal BUBB and the Buck activation MODEBU are on a logical high level. The second set signal SETBUBB is applied to the set input of the first flip-flop 88 via the first OR gate 86 and the signal at the output of the first flip-flop 88 sets the Buck-Boost activation signal MODEBB at the start of the next clock cycle via the first latch 89.

At the fourth tap 80 of the further voltage divider 70, a Buck-Boost-to-Boost reference voltage VREFBBBO is provided which is applied to the non-inverting input of the fourth comparator 90 and corresponds to the second reference voltage VR2 according to the following equation:

$$VREFBBBO = \beta \cdot (VREF - \alpha \cdot VR2)$$

A third generator output voltage BBBO is generated via the fourth comparator 90 depending on a difference of the error voltage VE and the Buck-Boost-to-Boost reference voltage VREFBBBO. The third comparator output signal BBBO and the Buck-Boost activation signal MODEBB are provided to the inputs of the third AND gate 91. The Buck-Boost activation signal MODEBB and the Buck activation signal MODEBU are applied to the inputs of the third OR gate 92. A third set signal SETBO which is generated at the output of the third AND gate 91 is applied to the data input of the second flip-flop 93. An output signal of the third OR gate 92 is applied to the reset input of the second flip-flop 93. An output signal provided at the output of the second flip-flop 93 is provided as a data signal to the data input of the second latch 94. Depending on the clock signal CLK which is provided to the clock input of the second latch 94, the Boost activation signal MODEBO is provided at the output of the second latch 94 and, therefore, also at the second output 35 of the mode selection circuit 31. If the error voltage VE is lower than the Buck-Boost-to-Boost reference voltage VREFBBBO and the DC/DC converter arrangement is in a Buck-Boost or a Buck mode of operation, then the Boost mode can be set at the start of the next clock cycle. If the first controllable duration td1 reaches the maximum value td1[max], the Buck-Boost to Boost reference voltage VREFBBBO equals the error voltage VE. The fourth comparator output signal BBBO is provided at the output of the fourth comparator 90 and is on a logical high level if the error voltage VE is lower than the Buck-Boost to Boost reference voltage VREFBBBO. The third set signal SETBO is on a logical high level if the fourth comparator output signal BBBO and the Buck-Boost activation signal MODEBB are on a logical high level. The third set signal SETBO is applied to the set input of the second flip-flop 93. A signal at the output of the second flip-flop 93 sets the Boost activation signal MODEBO at the start of the next clock cycle via the second latch 94.

Further on, a Buck-Boost-to-Buck reference voltage VREFBBBU is generated at the first tap 77 of the further voltage divider 70 and is applied to the inverting input of the fifth comparator 95. The Buck-Boost-to-Buck reference voltage VREFBBBU corresponds to the third reference voltage VR3 according to the following equation:

$$VREFBBBU = \beta \cdot (VREF - \alpha \cdot VR3)$$

A fifth comparator output signal BBBU is generated at the output of the fifth comparator 95 depending on the difference of the error signal VE and the Buck-Boost-to-Buck voltage reference VREFBBBU. The fifth comparator output signal BBBU and the Buck-Boost activation signal MODEBB are provided to the inputs of the fourth AND gate 96, so that a fourth set signal SETBU is generated at the output of the fourth AND gate 96. The fourth set signal SETBU is provided to the set input of the third flip-flop 98. The Buck-Boost activation signal and the Boost activation signal MODEBB, MODEBO are supplied to the two inputs of the fourth OR gate 97. An output signal of the fourth OR gate 97 is provided to the reset input of the third flip-flop 98. A signal provided at the output of the third flip-flop 98 is provided to the data input of the third latch 99. The clock signal CLK is provided to the clock input of the third latch 99. The Buck activation signal MODEBU is provided at the data output of the third latch 99 and is applied to the third output 36 of the mode selection circuit 31. If the error voltage VE is higher than the Buck-Boost-to-Buck reference voltage VREFBBBU and if the DC/DC converter arrangement is in a Buck-Boost or Boost mode of operation, then the Buck activation signal MODEBU can be set at the start of the next clock cycle. If the first controllable duration td1 reaches the minimum value td1[min], the Buck-Boost to Buck reference voltage VREFBBBU equals the error voltage VE. The fifth comparator output signal BBBU is on a logical high level if the error voltage VE is higher than the Buck-Boost to Buck reference voltage VREFBBBU. The fourth set signal SETBU is on a logical high level if only the fifth comparator output signal BBBU and the Buck-Boost activation signal MODEBB are on a logical high level. The fourth set signal SETBU is provided to the set input of the third flip-flop 98. A signal at the output of the third flip-flop 98 sets the Buck activation signal MODEBU at the start of the next clock cycle via the third latch 99.

It is an advantage of the four reference voltages VREFBO, VREFBU, VREFBBBO, VREFBBBU that they can be set as constant values even in case of a change of a value of the reference voltage VREF. An efficient conversion of the supply voltage VIN into the output voltage VOUT is achieved via the four reference values. The four reference voltages VREFBO, VREFBU, VREFBBBO, VREFBBBU can be ordered according to the following equation:

$$VREFBBBU > VREFBU > VREFBO > VREFBBBO$$

Figure 6A:
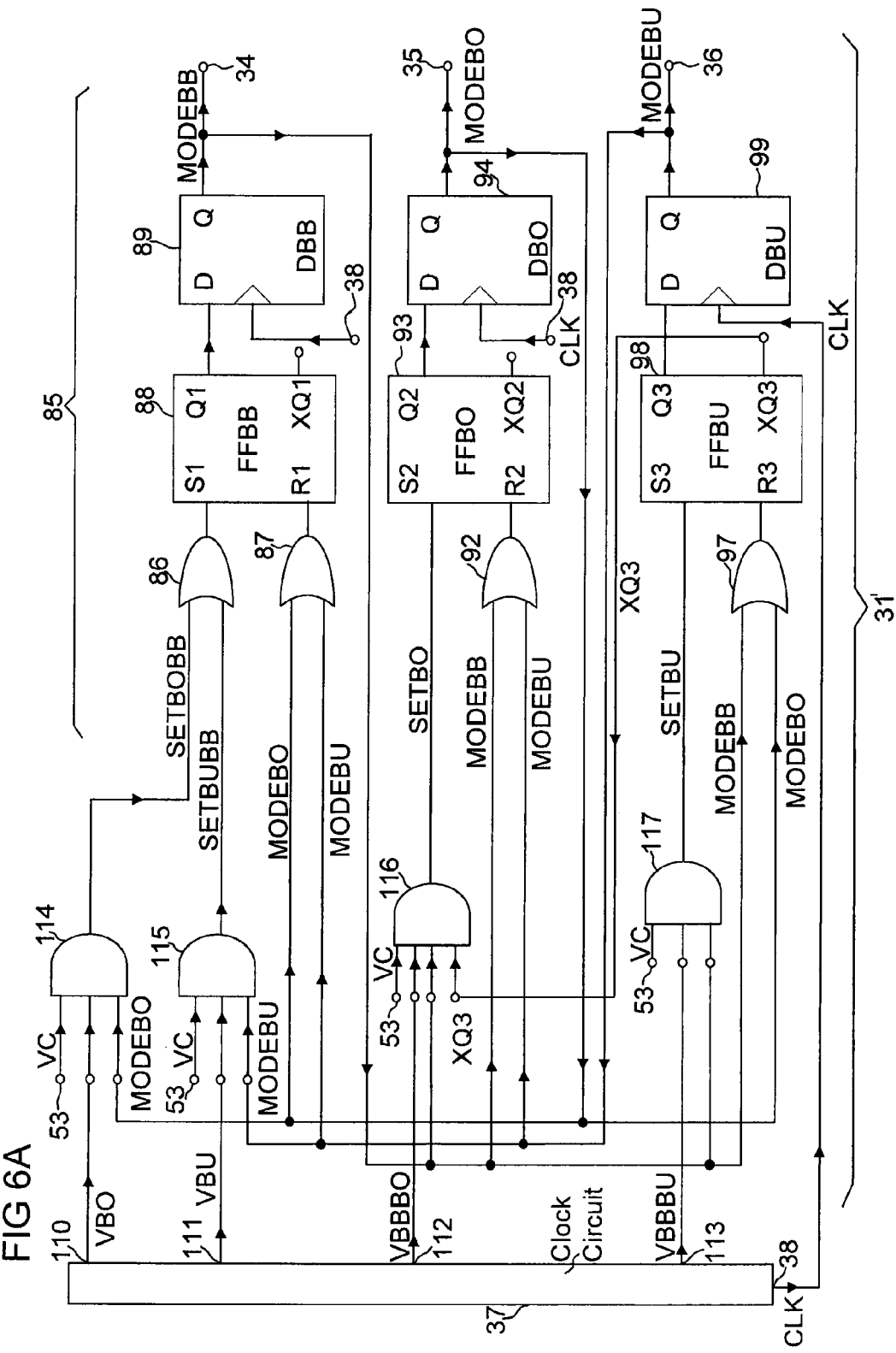

FIG. 6A shows another exemplary embodiment of a mode selection circuit 31' which is based on the mode selection circuit 31 of FIG. 5 and which can be inserted in the DC/DC converter arrangement shown in FIG. 1B. The clock circuit 37 comprises the first, the second, the third, the fourth and the fifth output 38, 110, 111, 112, 113 in conformity with FIG. 1B. The mode switching circuit 31' comprises a fifth AND gate 114 and a sixth AND gate 115. Further on, the mode selection circuit comprises the digital circuit 85 which is already shown in FIG. 5 and is not explained again in detail. A first input of the fifth AND gate 114 and a first input of the sixth AND gate 115 are connected to the output 27 of the first comparator 24 via the further input 53 of the mode selection circuit 31'. A second input of the fifth AND gate 114 is connected to the second output 110 of the clock circuit 37 and a third input of the fifth AND gate 114 is connected to the second output 35 of the mode selection circuit 31'. Further on, a second input of the sixth AND gate 115 is connected to the third output 111 of the clock circuit 37 and a third input of the sixth AND gate 115 is connected to the third output 36 of the mode selection circuit 31'. An output of the fifth AND gate 114 and an output of the sixth AND gate 115 are connected to the two inputs of the first OR gate 86 of the digital circuit 85. The two inputs of the second OR gate 82 of the digital circuit 85 are connected to the second and the third output 35, 36 of the mode selection circuit 31' in accordance with FIG. 5.

Furthermore, the mode selection circuit 31' comprises a seventh AND gate 116. A first input of the seventh AND gate 116 is connected to the output 27 of the first comparator 24 via the further input 53 of the mode selection circuit 31'. Further on, a second input of the seventh AND gate 116 is connected to a fourth output 112 of the clock circuit 37. Additionally, a third input of the seventh AND gate 116 is connected to the first output 34 of the mode selection 31'. Finally, a fourth input of the seventh AND gate 116 is connected to an inverted output of the third flip-flop 98 of the digital circuit 85. An output of the seventh AND gate 116 is connected to a set input of the second flip-flop 93 of the digital circuit 85. Consistently with FIG. 5, the two inputs of the third OR gate 92 are connected to the first and the third output 34, 36 of the mode selection circuit 31'.

Additionally, the mode selection circuit 31' comprises an eighth AND gate 117 with a first input which is connected to the output 27 of the first comparator 24 via the further input 53 of the mode selection circuit 31'. Furthermore, a second input of eighth AND gate 117 is connected to the fifth output 113 of the clock circuit 37. Additionally, a third input of the eighth AND gate 117 is connected to the first output 34 of the mode selection circuit 31'. An output of the eighth AND gate 117 is connected to a set input of the third flip-flop 98. In line with the mode selection circuit 31' shown in FIG. 5, the two inputs of the fourth AND gate 97 are connected to the first and the second outputs 34, 35 of the mode selection circuit 31'.

The comparator signal VC is generated at the output 27 of the first comparator 24. The function of the mode selection circuit 31' shown in FIG. 6A is explained using the FIGS. 6B to 6E.

FIG. 6B shows an exemplary timing of the signals during a transition from the Boost mode of operation to the Buck-Boost mode of operation. In a Boost mode of operation, the second switching phase B is triggered by the clock signal CLK. The second switching phase B lasts for the Boost duration tu. The first switching phase A follows the second switching phase B. After the end of the first switching phase A, the next clock signal CLK triggers the next clock cycle. The distance between two clock signals is the cycle time T. During the second switching phase B, the coil current IL rises to a certain value and during the first switching phase A the coil current IL falls again from that value to nearly zero. The second clock signal VBO is provided at the second output 110 of the clock circuit 37. The second clock signal VBO is triggered by the first clock signal CLK and lasts for a duration tu[min]. At the start of the first switching phase A, the comparator signal VC at the output 27 of the first comparator 24 is set. Since FIG. 6B shows a Boost mode cycle of operation, the Boost activation signal MODEBO is set to a logical high level. The first set signal SETBOBB which is provided at the output of the fifth AND gate 114 is generated by an AND combination of the comparator signal VC, the second clock signal VBO and the Boost activation signal MODEBO. The first set signal SETBOBB is on a logical high level at the beginning of the first switching phase A. This indicates that the duration tu of the second switching phase B has fallen below the duration tu[min]. It is an advantage that the transition from the Boost mode to the Buck-Boost mode takes place when the Boost duration tu of the second switching phase B reaches its minimum value tu[min]. In the Boost mode, the minimum clock cycle occurs if the second switching phase B obtains the shortest duration tu[min]. The second clock signal VBO has a constant pulse width with the duration tu[min].

FIG. 6C shows a transition from the Buck mode to the Buck-Boost mode of operation. Consistent with the FIGS. 2E and 2F, a clock cycle which is triggered by the clock signal CLK starts with the first switching phase A for the Buck time td, wherein the fourth switching phase D follows. After this switching sequence comprising the first and the fourth switching phases A, D with the cycle time T, the next clock signal CLK starts the next clock cycle. The coil current IL rises from approximately zero to a value during the first switching phase A and falls from the value to approximately zero in the fourth switching phase D. A third clock signal VBU is provided at the third output 111 of the clock circuit 37 and has a constant pulse width. The third clock signal VBU has a logical low level during a duration td[max] triggered by the clock signal CLK. The third clock signal VBU obtains a logical high level after the duration td[max] up to the end of the clock cycle. Therefore, the pulse width of the third clock signal VBU lasts for a duration T−td[max]. The comparator signal VC is set at the beginning of the fourth switching phase D. As FIG. 6C shows a Buck mode of operation, the Buck activation signal MODEBU is on a logical high level. The second set signal SETBUBB is provided by an AND combination of the third clock signal VBU, the comparator signal VC and the Buck activation signal MODEBU. The second set signal SETBUBB is on a logical high level at the beginning of the fourth switching phase D. It is an advantage that the transition from the Buck mode to the Buck-Boost mode of operation takes place if the Buck duration td reaches its maximum td[max]. In the Buck mode of operation, the maximum duty cycle occurs if the first switching phase A lasts for the longest time td[max].

Figure 6D:
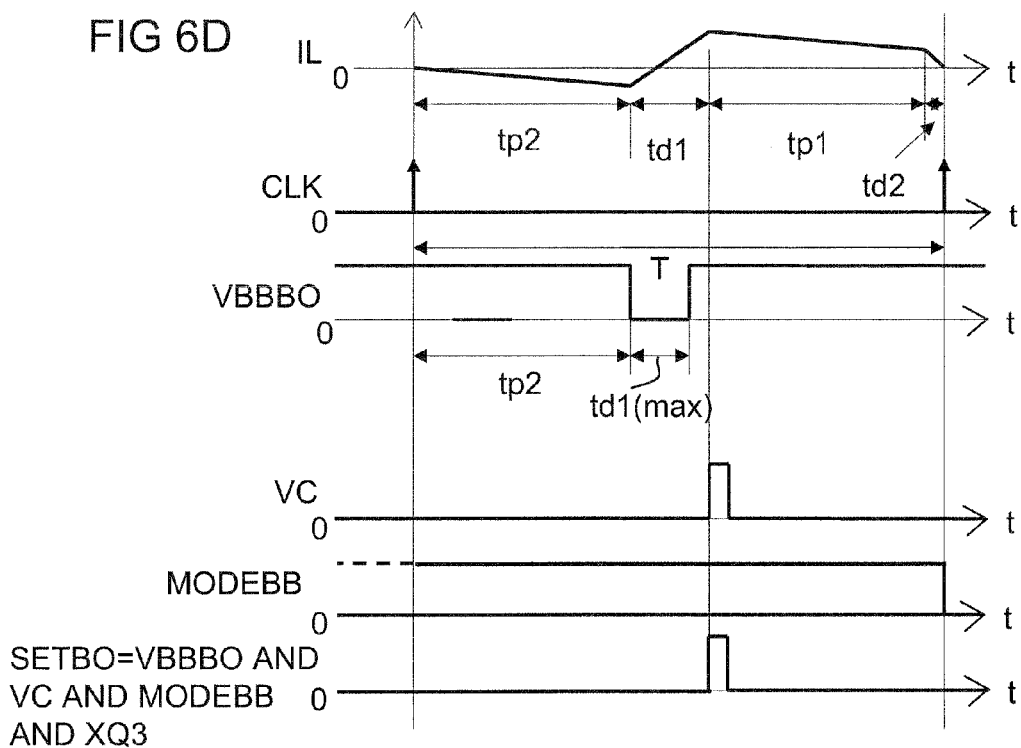

FIG. 6D shows an exemplary transition from the Buck-Boost mode to the Boost mode. The clock signal CLK triggers the cycle of the first, second, third and fourth switching phases A, B, C, D as already shown in FIGS. 2A and 2B. The first switching phase A lasts for the second predetermined time tp2. The fourth clock signal VBBBO has a logical high level during the first switching phase A and is set to a logical low level at the beginning of the second switching phase B. The fourth clock signal VBBBO is on the logical low level during a duration td1[max]. After the duration td1[max] the fourth clock signal VBBBO attains again a logical high level. The comparator signal VC is on a logical high level at the beginning of the third switching phase C. The third set signal SETBO is provided by a logical AND connection of the fourth clock signal VBBBO, the comparator signal VC, the Buck-Boost activation signal MODEBB and the signal at the inverted output XQ3 of the third flip-flop 98. The third set signal SETBO obtains a logical high level at the beginning of the third switching phase C, since the first controllable duration td1 is longer as the maximum value td1[max].

The transition from the Buck-Boost mode to the Boost mode advantageously takes place, if the first controllable time td1 reaches its maximum value td1[max]. The fourth clock signal VBBBO has a constant pulse width td1[max] which is derived from the clock circuit 37 with a delay of the second predetermined duration td2 with reference to the clock signal CLK.

Figure 6E:
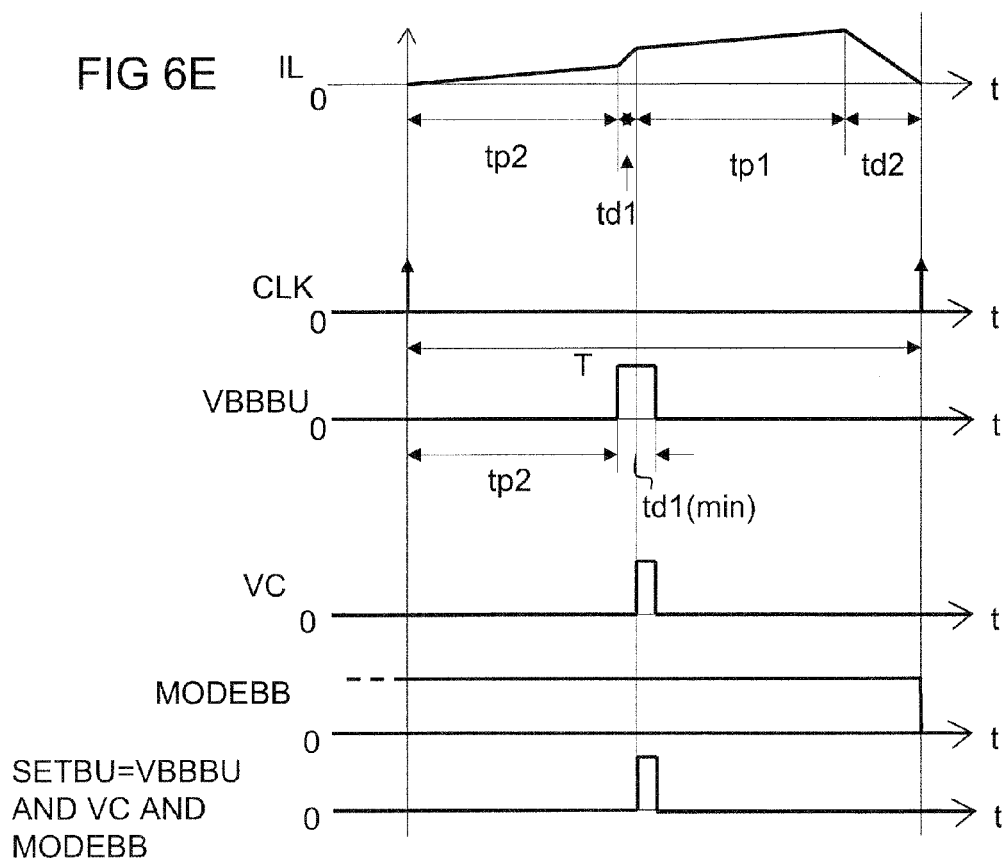

FIG. 6E shows an exemplary transition from a Buck-Boost mode to a Buck mode of operation. The fifth clock signal VBBBU is provided at the fifth output 113 of the clock circuit 37 at a logical low level during the first switching phase A. After that the fifth clock signal VBBBU is on a logical high level for the duration td1[min]. After this the fifth clock signal VBBBU is again on a logical low level. The comparator signal VC is triggered at the beginning of the third switching phase C. The fourth set signal SETBU is generated by an AND connection of the fifth clock signal VBBBU, the comparator signal VC and the Buck-Boost activation signal MODEBB. The fourth set signal SETBU is therefore set at the beginning of the third switching phase C. In this example, the second switching phase B obtains a small value of the first controllable duration td1, which is smaller than the duration td1[min]. It is an advantage that the transition from the Buck-Boost mode to the Buck mode of operation occurs if the first controllable duration td1 reaches its minimum value td1[min]. Therefore, the fifth clock signal VBBBU shows a constant pulse width with the duration td1[min] and is triggered with a delay of the second predetermined time tp2 with reference to the clock signal CLK. The fourth set signal SETBU is provided to the set input of the third flip-flop 89. The output of the third flip-flop 89 sets the Buck activation signal MODEBU at the start of the next clock cycle via the third latch 99.

In an alternative embodiment, one, two or three of the four set signals SETBOBB, SETBUBB, SETBO, SETBU are generated according to the mode selection circuit 31 shown in FIG. 5 instead of according to the mode selection circuit 31' shown in FIG. 6A.

Figure 7:
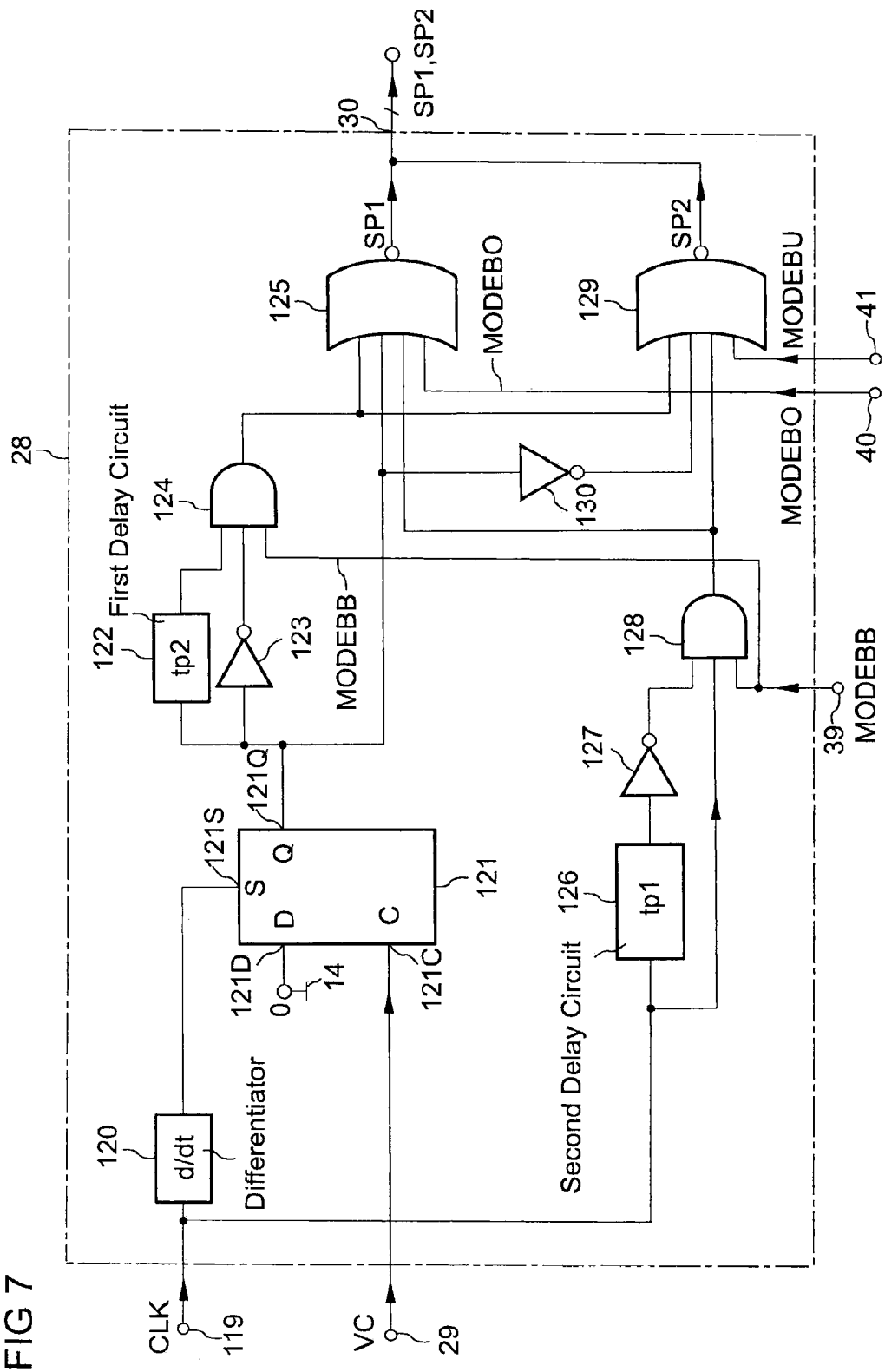
FIG. 7 shows an exemplary embodiment of a logic circuit.

FIG. 7 shows an exemplary embodiment of a logic circuit 28 which can be used in a DC/DC converter arrangement as shown in FIGS. 1A and 1B. The logic circuit 28 comprises several inputs such as the input 29 for the comparator signal VC, the first mode input 39 for the Buck-Boost activation signal MODEBB, the second mode input 40 for the Boost activation signal MODEBO, the third mode input 41 for the Buck activation signal MODEBU and a clock input 119 for the clock signal CLK. The logic circuit 28 comprises a differentiator 120 and a fourth latch 121. The output 38 of the clock circuit 37 is connected to an input of the differentiator 120 via the clock input 119. An output of the differentiator 120 is connected to a set input of the fourth latch 121. The output 27 of the first comparator 24 is connected to a clock input of the fourth latch 121 via the input 29 of the logic circuit 28. A data input of the fourth latch 121 is connected to the reference potential terminal 14. The logic circuit 28 further comprises a first delay circuit 122, a first inverter 123, a ninth AND-gate 124 and a first logic gate 125. The first logic gate 125 is designed as a NOR-gate. An output of the fourth latch 121 is connected to an input of the first delay circuit 122 and to an input of the first inverter 123. The first delay circuit 122 is designed as a circuit with a delay for a falling edge by the second predetermined duration tp2. The ninth AND-gate 124 comprises three inputs, a first one of which is connected to an output of the first delay circuit 122, a second one is connected to an output of the first inverter 123, and a third one is connected to the first mode set input 39 of the logic circuit 28.

The logic circuit 28 further comprises a second delay circuit 126, a second inverter 127, a tenth AND-gate 128 and a second logic gate 129. The second logic gate 129 is designed as a NOR-gate. The second delay circuit 126 is designed as a circuit with a delay for a rising edge with the first predetermined duration tp1. An input of the second delay circuit 126 is connected to the output 38 of the clock circuit 37 via the clock input 119. An output of the second delay circuit 126 is coupled to an input of the tenth AND-gate 128 via the second inverter 127. The tenth AND-gate 128 comprises two further inputs, one of which is connected to the output 38 of the clock circuit 37 via the clock input 119 and another is connected to the first mode set input 39 of the logic circuit 28.

The first logic gate 125 comprises four inputs. A first input of the first logic gate 125 is connected to an output of the ninth AND-gate 124. Further on, a second input is connected to the output of the fourth latch 121, a third input is connected to an output of the tenth AND-gate 128 and a fourth input of the first logic gate 125 is connected to the second mode set input 40. The second logic gate 129 also comprises four inputs, of which a first input is connected to the output of the ninth AND-gate 124 and a second input is coupled to the output of the fourth latch 121 via an third inverter 130. A third input is connected to the output of the tenth AND-gate 128 and a fourth input is connected to the third mode set input 41. An output of the first logic gate 125 is coupled to the first and the second switch 42, 43 via the output 30 of the logic circuit 28, while an output of the second logic gate 129 is coupled to the third and the fourth switch 44, 45 via the output 30 of the logic circuit 28.

The clock signal CLK is provided to the input of the differentiator 120. A reference voltage, preferably zero, is provided to the data input of the fourth latch 121. The first delay circuit 122 has a delay time which is equal to the second predetermined duration tp2 of the first switching phase A. The first delay circuit 122 sets the second predetermined duration tp2. The second delay circuit 126 has a delay time which is equal to the first predetermined duration tp1 of the third switching phase C. The second delay circuit 126 sets the first predetermined duration tp1.

In an embodiment, the output of the first logic gate 125 is directly connected to the control terminals of the first and the second switch 42, 43. The output of the second logic gate 129 is directly connected to the control terminals of the third and the fourth switch 44, 45. This may be advantageous if the first and the fourth switch 42, 45 are designed as p-channel field-effect transistor and the second and the third switch 43, 44 are designed as n-channel field-effect transistor.

The logic gates such as the AND gates and the OR gates used in the different circuit parts can be realized using logically equivalent combinations of logic gates. For example, an AND gate can be replaced by a NAND gate and an inverter gate or replaced by two inverter gates and a NOR gate.

The invention claimed is:

1. A method for DC/DC conversion, comprising the steps of operating in a Boost mode of operation or in a Buck-Boost mode of operation;
    switching from the Boost mode of operation to the Buck-Boost mode of operation, if a desired value of an output voltage which is generated from a supply voltage by the DC/DC conversion is smaller than a first reference voltage;
    switching from the Buck-Boost mode of operation to the Boost mode of operation, if the desired value is larger than a second reference voltage;
    generating, by a clock circuit, a clock signal having a cycle time, the Buck-Boost mode of operation having four switching phases, a sum of durations of the four switching phases being the cycle time which is constant; and
    providing, by first and second delay circuits, first and second respective delays, the first delay setting a second predetermined duration of a first switching phase of the four switching phases, and the second delay setting a first predetermined duration of a third switching phase of the four switching phases.

2. The method for DC/DC conversion according to claim 1, wherein the first reference voltage is lower than the second reference voltage.

3. The method for DC/DC conversion according to claim 1, further comprising:
    switching from the Buck-Boost mode of operation to a Buck mode of operation, if the desired value is smaller than a third reference voltage; and
    switching from the Buck mode of operation to the Buck-Boost mode of operation, if the desired value is larger than a fourth reference voltage.

4. The method for DC/DC conversion according to claim 3, wherein the third reference voltage is lower than the fourth reference voltage and the fourth reference voltage is lower than the first reference voltage.

5. The method of DC/DC conversion according to claim 3, further comprising:
    controlling a first switch coupling an input terminal at which the supply voltage is provided to a first terminal of a coil;
    controlling a second switch coupling the first terminal of the coil to a reference potential terminal;
    controlling a third switch coupling a second terminal of the coil to the reference potential terminal; and
    controlling a fourth switch coupling the second terminal of the coil to an output terminal at which the output voltage is provided.

6. The method for DC/DC conversion according to claim 5, comprising a control sequence with the first, a second, the third and a fourth switching phase in the Buck-Boost mode of operation, wherein:
    during the first switching phase the first and the fourth switch are in a closed switching position and the second and the third switch are in an open switching position,
    during the second switching phase the first and the third switch are in a closed switching position and the second and the fourth switch are in an open switching position,
    during the third switching phase the first and the fourth switch are in a closed switching position and the second and the third switch are in an open switching position, and
    during the fourth switching phase the second and the fourth switch are in a closed switching position and the first and the third switch are in an open switching position.

7. The method for DC/DC conversion according to claim 6, comprising a control sequence of the Boost mode of operation having the first and the second switching phases, wherein the first and the second switching phases are activated alternatively.

8. The method for DC/DC conversion according to claim 6, comprising a control sequence of the Buck mode of operation having the first and the fourth switching phases, wherein the first and the fourth switching phases are activated alternatively.

9. The method according to claim 6, the control sequence comprising:
    the first predetermined duration obtained by the third switching phase;
    the second predetermined duration obtained by the first switching phase;
    a first controllable duration obtained by the second switching phase; and
    a second controllable duration obtained by the fourth switching phase,
    wherein the value of the output voltage is a function of the first controllable duration, of the second controllable duration, of the first predetermined duration, the second predetermined duration, and a value of the supply voltage.

10. The method according to claim 9, wherein a value VR3 of the third reference voltage can be calculated according to the equations:

$$VR3 = VIN \cdot \frac{td1[\min] + tp1 + tp2}{td2[\max] + tp1 + tp2} \text{ and}$$

$$T = td1[\min] + td2[\max] + tp1 + tp2,$$

wherein VIN is a value of the supply voltage, td1[min] is a minimum value of the first controllable duration, tp1 is a value of the first predetermined duration, tp2 is a value of the second predetermined duration, td2[max] is a maximum value of the second controllable duration, and T is a predetermined cycle time.

11. The method according to claim 9, wherein a value VR2 of the second reference voltage can be calculated according to the equations:

$$VR2 = VIN \cdot \frac{td1[\max] + tp1 + tp2}{td2[\min] + tp1 + tp2} \text{ and}$$

$$T = td1[\max] + td2[\min] + tp1 + tp2,$$

wherein VIN is a value of the supply voltage, td1[max] is a maximum value of the first controllable duration, tp1 is a value of the first predetermined duration, tp2 is a value of the second predetermined duration, td2[min] is a minimum value of the second controllable duration, and T is a predetermined cycle time.

12. A DC/DC converter arrangement, comprising:
    an input terminal at which a supply voltage is provided;
    an output terminal at which an output voltage is provided;
    a switching arrangement connected between the input terminal and the output terminal;
    a mode selection circuit including an input s coupled to the output terminal, a first output coupled to a logic circuit for providing a Buck-Boost activation signal, and a second output coupled to the logic circuit for providing a Boost activation signal, the mode selection circuit operating in a present clock cycle and in a next clock cycle which follows the present clock cycle, and the mode selection circuit setting the Buck-Boost activation signal to a logical high level at a start of the next clock cycle, if a desired value of the output voltage is smaller than a first reference value and the Boost activation signal is set to a logical high level in the present clock cycle, and the mode selection circuit setting the Boost activation signal to the logical high level at the start of the next clock cycle, if the desired value is larger than a second reference value and the Buck-Boost activation signal is set to the logical high level in the present clock cycle;

a clock circuit configured to provide a clock signal having a cycle time, a Buck-Boost mode of operation having four switching phases, a sum of durations of the four switching phases being the cycle time which is constant, and the logic circuit being coupled to the switching arrangement for controlling the switching arrangement, the logic circuit comprising a first and a second delay circuit, the first delay circuit setting a second predetermined duration of a first switching phase of the four switching phases, and the second delay circuit setting a first predetermined duration of a third switching phase of the four switching phases.

13. The DC/DC converter arrangement according to claim 12, wherein the mode selection circuit comprises a third output coupled to the logic circuit for providing a Buck activation signal.

14. The DC/DC converter arrangement according to claim 13, wherein the mode selection circuit sets the Buck-Boost activation signal to the logical high level at the start of the next clock cycle, if the desired value is larger than a fourth reference value and the Buck activation signal is set to a logical high level in the present clock cycle, and the Buck activation signal to the logical high level at the start of the next clock cycle, if the desired value is smaller than a third reference value and the Buck-Boost activation signal is set to the logical high level in the present clock cycle.

15. The DC/DC converter arrangement according to claim 13, wherein the mode selection circuit generates only one of the Buck activation signal, the Buck-Boost activation signal and the Boost activation signal with the logical high level at a time.

16. The DC/DC converter arrangement according to claim 13, wherein the mode selection circuit comprises:
a first latch for generating the Buck-Boost activation signal;
a second latch for generating the Boost activation signal; and
a third latch for generating the Buck activation signal.

17. The DC/DC converter arrangement according to claim 12, further comprising:
a first voltage divider which couples the output terminal to a reference potential terminal;
an amplifier with a first input coupled to an output of the first voltage divider and a second input to which a reference voltage is supplied; and
a first comparator with a first input coupled to an output of the amplifier, a second input to which a sense voltage is applied which depends on a coil current flowing in the switching arrangement and with an output connected to an input of the logic circuit.

18. The DC/DC converter arrangement according to claim 17, wherein the mode selection circuit is coupled to the output of the amplifier by one of a connection of an input of the mode selection circuit to the output of the amplifier and a connection of a further input of the mode selection circuit to the output of the first comparator.

19. The DC/DC converter arrangement according to claim 12, wherein the switching arrangement comprises:
a first switch coupling the input terminal to a first terminal of a coil;
a second switch coupling the first terminal of the coil to a reference potential terminal;
a third switch coupling a second terminal of the coil to the reference potential terminal; and
a fourth switch coupling the second terminal of the coil to the output terminal.

20. A DC/DC converter arrangement, comprising:
an input terminal at which a supply voltage is provided;
an output terminal at which an output voltage is provided;
a switching arrangement connected between the input terminal and the output terminal;
a logic circuit which is coupled to the switching arrangement for controlling the switching arrangement;
a mode selection circuit including an input coupled to the output terminal, a first output coupled to the logic circuit for providing a Buck-Boost activation signal, and a second output coupled to the logic circuit for providing a Boost activation signal, the mode selection circuit operating in a present clock cycle and in a next clock cycle which follows the present clock cycle, and the mode selection circuit setting the Buck-Boost activation signal to a logical high level at a start of the next clock cycle, if a desired value of the output voltage is smaller than a first reference value and the Boost activation signal is set to a logical high level in the present clock cycle, and the mode selection circuit setting the Boost activation signal to the logical high level at the start of the next clock cycle, if the desired value is larger than a second reference value and the Buck-Boost activation signal is set to the logical high level in the present clock cycle;
a first voltage divider which couples the output terminal to a reference potential terminal;
an amplifier with a first input coupled to an output of the first voltage divider and a second input to which a reference voltage is supplied;
a clock circuit configured to provide a clock signal having a clock cycle with a cycle time, a Buck-Boost mode of operation having four switching phases, a sum of durations of the four switching phases is the cycle time which is constant; and
a first comparator with a first input coupled to an output of the amplifier, a second input to which a sense voltage is applied which depends on a coil current flowing in the switching arrangement and with an output connected to an input of the logic circuit, a comparator signal being supplied by the first comparator and controlling a first controllable duration of a second switching phase of the four switching phases, a first and a third switching phase of the four switching phases each having a constant duration.

21. A method for DC/DC conversion, comprising the steps of:
operating in a Boost mode of operation or in a Buck-Boost mode of operation;

switching from the Boost mode of operation to the Buck-Boost mode of operation, if a desired value of an output voltage which is generated from a supply voltage by the DC/DC conversion is smaller than a first reference voltage;

switching from the Buck-Boost mode of operation to the Boost mode of operation, if the desired value is larger than a second reference voltage;

generating, by a clock circuit, a clock signal having a cycle time, the Buck-Boost mode of operation having four switching phases, a sum of durations of the four switching phases being the cycle time which is constant;

supplying a feedback voltage to first input of an amplifier, the feedback voltage depending on an output voltage of a first voltage divider;

supplying a reference voltage to a second input of the amplifier; and providing an error voltage generated by the amplifier to a first comparator, a comparator signal being generated by the first comparator and controlling a first controllable duration of a second switching phase of the four switching phases, a first and a third switching phase of the four switching phases each having a constant duration.

* * * * *

UNITED STATES PATENT AND TRADEMARK OFFICE
CERTIFICATE OF CORRECTION

| | | |
|---|---|---|
| PATENT NO. | : 8,179,113 B2 | Page 1 of 1 |
| APPLICATION NO. | : 12/666973 | |
| DATED | : May 15, 2012 | |
| INVENTOR(S) | : Pramod Singnurkar | |

It is certified that error appears in the above-identified patent and that said Letters Patent is hereby corrected as shown below:

In the Claims

Col. 22, Claim 12, line 6, after "input" and before "coupled", delete "s".

Signed and Sealed this
Eleventh Day of March, 2014

Michelle K. Lee
*Deputy Director of the United States Patent and Trademark Office*

UNITED STATES PATENT AND TRADEMARK OFFICE
CERTIFICATE OF CORRECTION

PATENT NO.         : 8,179,113 B2                                Page 1 of 1
APPLICATION NO.    : 12/666973
DATED              : May 15, 2012
INVENTOR(S)        : Pramod Singnurkar It is certified that error appears in the above-identified patent and that said Letters Patent is hereby corrected as shown below:

In the Claims

Col. 22, Claim 12, line 66, after "input" and before "coupled", delete "s".

This certificate supersedes the Certificate of Correction issued March 11, 2014.

Signed and Sealed this
First Day of April, 2014

Michelle K. Lee
*Deputy Director of the United States Patent and Trademark Office*